(12) United States Patent
Fox et al.

(10) Patent No.: US 8,983,881 B2
(45) Date of Patent: Mar. 17, 2015

(54) BENCHMARKING PROGRESSIVE SYSTEMS FOR SOLVING COMBINATORIAL PROBLEMS

(71) Applicant: The Boeing Company, Huntington Beach, CA (US)

(72) Inventors: Barry R. Fox, Ballwin, MO (US); Steven Jowers, Friendswood, TX (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/480,858

(22) Filed: Sep. 9, 2014

(65) Prior Publication Data
US 2014/0379401 A1 Dec. 25, 2014

Related U.S. Application Data

(60) Division of application No. 14/033,690, filed on Sep. 23, 2013, now Pat. No. 8,849,733, which is a continuation-in-part of application No. 13/110,663, filed on May 18, 2011, now Pat. No. 8,543,524.

(51) Int. Cl.
G06F 15/18 (2006.01)
G06F 7/60 (2006.01)
G06Q 10/06 (2012.01)

(52) U.S. Cl.
CPC ................................. G06Q 10/06313 (2013.01)
USPC ................................................. 706/12; 703/2

(58) Field of Classification Search
None
See application file for complete search history.

(56) References Cited

U.S. PATENT DOCUMENTS

| 5,890,134 | A | 3/1999 | Fox |
| 8,417,652 | B2 | 4/2013 | Fox et al. |
| 2013/0254142 | A1* | 9/2013 | Hodjat et al. .................... 706/12 |

OTHER PUBLICATIONS

Aiex et al., "TTTPLOTS: A Perl Program to Create Time-to-Target Plots," 2005, AT&T Labs Research Technical Report: TD-6HT7EL, 17 pages.
Aiex et al., "Probability Distribution of Solution Time in GRASP: An Experimental Investigation," Copyright 2002, Journal of Heuristics 8 (2002), pp. 343-373.
Avis, D., Davis, B., and Steele, J.M., "Probabilistic Analysis of a Greedy Heuristic for Euclidean Matching," Probability in the Engineering and Informational Sciences 2 (1988), pp. 143-156.

(Continued)

*Primary Examiner* — Alan Chen
(74) *Attorney, Agent, or Firm* — Womble Carlyle Sandridge & Rice LLP

(57) ABSTRACT

A system is provided for benchmarking a progressive combinatorial solver. The system may initialize a parametric model collector, and perform a plurality of parametric trials associated with respective numbers of sub-part iterations of the progressive combinatorial solver. For each of the plurality of parametric trials, the system may initialize a statistical data collector. The system may perform a plurality of randomized executions of the progressive combinatorial solver, and add data including metric values for respective solutions of the executions to the statistical data collector. The system may then determine statistical parameter(s) of data in the statistical data collector, and add data including an indication of the respective number of sub-part iterations, a cost of finding the metric values for the respective solutions, and the statistical parameters of the trial to the parametric data collector. And the system may determine a best-fit model from data in the parametric data collector.

21 Claims, 25 Drawing Sheets

(56) References Cited

OTHER PUBLICATIONS

Borgwardt, K. H., "Probabilistic Analysis of Optimization Algorithms—Some Aspects from a Practical Point of View," Acta Applicandae Mathematicae 10 (1987), pp. 171-210.
Bresina et al., "Search Space Characterization for a Telescope Scheduling Application," Copyright 1994, AAAI Technical Report FS-94-01, pp. 10-15.
Brglez et al., "Performance Testing of Combinatorial Solvers With Isonnorph Class Instances," Copyright 2007, 2007 Workshop on Experimental Computer Science, Jun. 13-14, 2007, 12 pages.
Cheeseman et al., "Where the Really Hard Problems Are," Copyright 1991, Proceedings of the 12th International Joint Conference on Artificial Intelligence, vol. 1, pp. 331-337.
Cicirello, V. A., and Smith, S.F. 2004. "Heuristic Selection for Stochastic Search Optimization: Modeling Solution Quality by Extreme Value Theory," In Wallace, Mark ed. Principles and Practice of Constraint Programming—CP 2004. Springer, Berlin, 15 pages.
Debels et al., "A Hybrid Scatter Search/Electromagnetism Meta-Heuristic for Project Scheduling," Copyright 2004, European Journal of Operational Research 169 (2006), pp. 638-653.
Feo et al., "A Greedy Randomized Adaptive Search Procedure for Maximum Independent Set," 1989, Operations Research 42 (1994), 38 pages.
Fox, B. and Ringer, M., 1995, AAAI SIGMAN Planning and Scheduling Benchmarks, http://www.neosoft.com/benchmrx, 51 pages.
Fox et al., "Genetic Operators for Sequencing Problems," in: Foundations of Genetic Algorithms, Rawlins, Copyright 1991, Morgan Kaufmann Publishers, Inc., pp. 284-300, 21 pages.
Fox, B. "Non-Chronological Scheduling," Copyright 1990, AI, Simulation, and Planning in High Autonomy Systems, 1990, Proceedings.. IEEE, pp. 72-77.
Gonçalves et al., "A Biased Random-Key Genetic Algorithm with Forward-Backward Improvement for the Resource Constrained Project Scheduling Problem," Mar. 11, 2009, Copyright 2010, Technical Report, AT&T Labs Research, Florham Park, NJ, pp. 1-26.
Gonçalves et al., "A Genetic Algorithm for the Resource Constrained Multi-Project Scheduling Problem," European Journal of Operational Research 189 (2008), pp. 1171-1190.
Gonçalves et al., "A Hybrid Genetic Algorithm for the Job Shop Scheduling Problem," European Journal of Operational Research 167.1 (2005), pp. 77-95.
Gumbel, E.J., "Statistics of Extremes," 1958, Columbia University Press, 402 pages.
Hartmann et al., "A Survey of Variants and Extensions of the Resource-Constrained Project Scheduling Problem," European Journal of Operational Research 207 (2010), pp. 1-14.
Hartmann et al., "Experimental Evaluation of State-of-the-Art Heuristics for the Resource-Constrained Project Scheduling Problem," European Journal of Operational Research 127 (2000), pp. 394-407.
Hoos et al., "Towards a Characterisation of the Behaviour of Stochastic Local Search Algorithms for SAT," Copyright 1999, Artificial Intelligence 112 (1999), 21 pages.
Karam et al., "Recent Trends in Solving the Deterministic Resource Constrained Project Scheduling Problem," published Mar. 2013, Innovations in Information Technology (IIT), 2013 9th International Conference, pp. 1-6.
Karp, R.M. and Steele, J.M. "Probabilistic Analysis of Heuristics," 1985, In Lawler, E.L., Lenstra, J.K, Rinnooy Kan, A.H.G, and Shmoys, D.B. eds. The Traveling Salesman Problem. John Wiley & Sons, pp. 181-205.

Kolisch et al., "PSPLIB—A Project Scheduling Problem Library: OR Software—ORSEP Operations research Software Exchange Program," European Journal of Operational Research 96 (1996), pp. 205-216.
Kolisch et al., "Experimental Investigation of Heuristics for Resource-Constrained Project Scheduling: An Update," Copyright 2005, European Journal of Operational Research 174.1 (2006), pp. 23-37.
Kolisch et al., "Heuristic algorithms for the resource-constrained project scheduling problem: Classification and computational analysis," in: Project Scheduling, Springer US, Copyright 1999, pp. 147-178.
Li et al., "An Iterative Scheduling Technique for Resource-Constrained Project Scheduling," European Journal of Operational Research 56 (1992), pp. 370-379.
Mendes et al., "A Random Key Based Genetic Algorithm for the Resource Constrained Project Scheduling Problem," Computers & Operations Research 36.1 (2009), pp. 92-109.
Mobini et al., "Using an Enhanced Scatter Search Algorithm for a Resource-Constrained Project Scheduling Problem," Copyright 2008, Soft Comput 13 (2009), pp. 597-610.
Montana, D., "How to Make Scheduling Research Relevant," In Proceedings of the Genetic and Evolutionary Computation Conference, GECCO. vol. 2 (2002) 4 pages.
Nascimento et al., "GRASP Heuristic With Path-Relinking for the Multi-plant Capacitated Lot Sizing Problem," European Journal of Operational Research 200.3 (2010), pp. 747-754.
Noronha et al., "A Biased Random-Key Genetic Algorithm for Routing and Wavelength Assignment," Journal of Global Optimization 50.3 (2011), pp. 503-518.
Ozdamar et al., "A Note on an Iterative Forward/Backward Scheduling Technique with Reference to a Procedure by Li and Willis," European Journal of Operational Research 89 (1996), pp. 400-407.
Ozdamar et al., "A Survey on the Resource-Constrained Project Scheduling Problem," IIE Transactions 27, 1995, pp. 574-586.
Paraskevopoulos et al., "Solving Project Scheduling Problems with Resource Constraints via an Event List-Based Evolutionary Algorithm," Expert Systems with Applications 39 (2012) pp. 3983-3994.
Rardin, R. L. and Uzsoy, R., "Experimental Evaluation of Heuristic Optimization Algorithms: A Tutorial," Journal of Heuristics 7 (2001), pp. 261-304.
Ribeiro et al., "Exploiting Run Time Distributions to Compare Sequential and Parallel Stochastic Local Search Algorithms," 2009, MIC 2009: The VIII Metaheuristics International Conference; Hamburg, Germany, 52 pages.
Ribeiro et al., "On the Use of Run Time Distributions to Evaluate and Compare Stochastic Local Search Algorithms," Copyright 2009, Engineering Stochastic Local Search Algorithms. Designing, Implementing and Analyzing Effective Heuristics, pp. 16-30.
Streeter, M., "Using Online Algorithms to Solve NP-Hard Problems More Efficiently in Practice," Copyright 2007, Ph.D. Thesis, CMU-CS-07-172, Department of Computer Science, Carnegie-Melon University, Pittsburgh, PA, 205 pages.
Valls et al., "A Hybrid Genetic Algorithm for the Resource-Constrained Project Scheduling Problem," European Journal of Operational Research 185 (2008), pp. 495-508.
Valls et al., "Justification and RCPSP: A Technique That Pays," Copyright 2004, European Journal of Operational Research 165 (2005), pp. 375-386.
Valls et al., "Resource-Constrained Project Scheduling: A Critical Activity Reordering Heuristic," Copyright 2002, European Journal of Operational Research 149 (2003), pp. 282-301.

* cited by examiner

Sequence #1: 1, 3, 5, 7, 6, 4, 2, 8, 0, 9

|   | 0 | 1 | 2 | 3 | 4 | 5 | 6 | 7 | 8 | 9 |
|---|---|---|---|---|---|---|---|---|---|---|
| 0 |   | 1 | 1 | 1 | 1 | 1 | 1 | 1 | 1 | 1 |
| 1 |   |   | 1 | 1 | 1 | 1 | 1 | 1 | 1 | 1 |
| 2 |   |   |   |   |   |   |   |   |   |   |
| 3 |   |   | 1 |   | 1 | 1 | 1 |   |   |   |
| 4 |   |   | 1 |   |   | 1 | 1 |   |   |   |
| 5 |   |   | 1 |   |   |   | 1 |   |   |   |
| 6 |   |   | 1 |   |   |   |   |   |   |   |
| 7 |   |   | 1 | 1 | 1 | 1 | 1 |   | 1 | 1 |
| 8 |   |   | 1 | 1 | 1 | 1 | 1 |   |   |   |
| 9 |   |   | 1 | 1 | 1 | 1 | 1 |   | 1 |   |

Sequence #2: 0, 1, 7, 9, 8, 3, 4, 5, 6, 2

FIG. 6

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 | 1 |   |   | 1 | 1 | 1 | 1 | 1 | 1 | 1 |
| 2 | 1 | 1 |   | 1 | 1 | 1 | 1 | 1 | 1 | 1 |
| 3 | 1 |   |   |   |   |   |   |   |   |   |
| 4 | 1 |   |   | 1 |   |   |   |   | 1 | 1 |
| 5 | 1 |   |   | 1 | 1 |   |   |   |   |   |
| 6 | 1 |   |   | 1 | 1 | 1 |   |   |   |   |
| 7 | 1 |   |   | 1 | 1 | 1 | 1 |   | 1 | 1 |
| 8 | 1 |   |   | 1 | 1 | 1 | 1 |   |   | 1 |
| 9 | 1 |   |   | 1 | 1 | 1 | 1 |   |   |   |

Sequence #3: 2, 1, 7, 8, 9, 6, 5, 4, 3, 0

FIG. 7

|   | 0 | 1 | 2 | 3 | 4 | 5 | 6 | 7 | 8 | 9 |
|---|---|---|---|---|---|---|---|---|---|---|
| 0 |   | 1 |   | 1 |   |   |   | 1 |   |   |
| 1 |   |   |   | 1 |   |   |   | 1 |   |   |
| 2 | 1 | 1 |   | 1 |   |   | 1 | 1 |   | 1 |
| 3 |   |   |   |   |   |   |   |   |   |   |
| 4 | 1 | 1 | 1 | 1 | 1 | 1 | 1 | 1 |   | 1 |
| 5 | 1 | 1 | 1 | 1 |   |   | 1 | 1 |   | 1 |
| 6 | 1 | 1 |   | 1 |   |   |   | 1 |   | 1 |
| 7 |   |   |   | 1 |   |   |   |   |   |   |
| 8 | 1 | 1 | 1 | 1 | 1 | 1 | 1 | 1 |   | 1 |
| 9 | 1 | 1 |   | 1 |   |   |   |   |   |   |

Sequence #4: 8, 4, 5, 2, 6, 9, 0, 1, 7, 3

|   | 0 | 1 | 2 | 3 | 4 | 5 | 6 | 7 | 8 | 9 |
|---|---|---|---|---|---|---|---|---|---|---|
| 0 | 0 | 1 | 1 | 1 | 1 | 1 | 1 | 1 | 1 | 2 |
| 1 | 1 | 0 | 2 | 2 | 2 | 2 | 2 | 2 | 2 | 2 |
| 2 | 1 | 0 | 0 | 0 | 0 | 0 | 0 | 0 | 1 | 1 |
| 3 | 1 | 0 | 2 | 0 | 2 | 2 | 2 | 1 | 1 | 1 |
| 4 | 1 | 0 | 2 | 0 | 0 | 1 | 1 | 0 | 1 | 1 |
| 5 | 1 | 0 | 2 | 0 | 1 | 0 | 2 | 1 | 1 | 1 |
| 6 | 1 | 0 | 2 | 0 | 1 | 0 | 0 | 0 | 1 | 1 |
| 7 | 1 | 0 | 2 | 1 | 2 | 1 | 2 | 0 | 2 | 2 |
| 8 | 1 | 0 | 1 | 1 | 1 | 1 | 1 | 0 | 0 | 1 |
| 9 | 0 | 0 | 1 | 1 | 1 | 1 | 1 | 0 | 1 | 0 |

Sequence #1: 1, 3, 5, 7, 6, 4, 2, 8, 0, 9

Sequence #2: 0, 1, 7, 9, 8, 3, 4, 5, 6, 2

|   | 0 | 1 | 2 | 3 | 4 | 5 | 6 | 7 | 8 | 9 |
|---|---|---|---|---|---|---|---|---|---|---|
| 0 | 0 | 1 | 1 | 1 | 1 | 1 | 1 | 1 | 1 | 2 |
| 1 | 2 | 0 | 2 | 3 | 3 | 3 | 3 | 3 | 3 | 3 |
| 2 | 2 | 1 | 0 | 1 | 1 | 1 | 1 | 1 | 2 | 2 |
| 3 | 2 | 0 | 2 | 0 | 2 | 2 | 2 | 1 | 1 | 1 |
| 4 | 2 | 0 | 2 | 1 | 0 | 1 | 1 | 0 | 1 | 1 |
| 5 | 2 | 0 | 2 | 1 | 2 | 0 | 2 | 1 | 1 | 1 |
| 6 | 2 | 0 | 2 | 1 | 2 | 1 | 0 | 0 | 1 | 1 |
| 7 | 2 | 0 | 2 | 2 | 3 | 2 | 3 | 0 | 3 | 3 |
| 8 | 2 | 0 | 1 | 2 | 2 | 2 | 2 | 0 | 0 | 2 |
| 9 | 1 | 0 | 1 | 2 | 2 | 2 | 2 | 0 | 1 | 0 |

Sequence #1: 1, 3, 5, 7, 6, 4, 2, 8, 0 , 9

Sequence #2: 0, 1, 7, 9, 8, 3, 4, 5, 6, 2

Sequence #3: 2, 1, 7, 8, 9, 6, 5, 4, 3, 0

|   | 0 | 1 | 2 | 3 | 4 | 5 | 6 | 7 | 8 | 9 |
|---|---|---|---|---|---|---|---|---|---|---|
| 0 | 0 | 2 | 1 | 2 | 1 | 1 | 1 | 2 | 1 | 2 |
| 1 | 2 | 0 | 2 | 4 | 3 | 3 | 3 | 4 | 3 | 3 |
| 2 | 3 | 2 | 0 | 2 | 1 | 1 | 2 | 2 | 2 | 3 |
| 3 | 2 | 0 | 2 | 0 | 2 | 2 | 2 | 1 | 1 | 1 |
| 4 | 3 | 1 | 3 | 2 | 0 | 2 | 2 | 1 | 1 | 2 |
| 5 | 3 | 1 | 3 | 2 | 2 | 0 | 3 | 2 | 1 | 2 |
| 6 | 3 | 1 | 2 | 2 | 2 | 1 | 0 | 1 | 1 | 2 |
| 7 | 2 | 0 | 2 | 3 | 3 | 2 | 3 | 0 | 3 | 3 |
| 8 | 3 | 1 | 2 | 3 | 3 | 3 | 3 | 1 | 0 | 3 |
| 9 | 2 | 1 | 1 | 3 | 2 | 2 | 2 | 1 | 1 | 0 |

Sequence #1: 1, 3, 5, 7, 6, 4, 2, 8, 0, 9

Sequence #2: 0, 1, 7, 9, 8, 3, 4, 5, 6, 2

Sequence #3: 2, 1, 7, 8, 9, 6, 5, 4, 3, 0

Sequence #4: 8, 4, 5, 2, 6, 9, 0, 1, 7, 3

|   | 0 | 1 | 2 | 3 | 4 | 5 | 6 | 7 | 8 | 9 |    |
|---|---|---|---|---|---|---|---|---|---|---|----|
| 0 | 0 | 1 | 0 | 1 | 0 | 0 | 0 | 1 | 0 | 1 | 4  |
| 1 | 2 | 0 | 1 | 3 | 2 | 2 | 2 | 3 | 2 | 2 | 19 |
| 2 | 3 | 2 | 0 | 2 | 1 | 1 | 2 | 2 | 2 | 3 | 18 |
| 3 | 2 | 0 | 1 | 0 | 1 | 1 | 1 | 1 | 1 | 1 | 9  |
| 4 | 3 | 1 | 2 | 2 | 0 | 1 | 1 | 1 | 1 | 2 | 14 |
| 5 | 3 | 1 | 2 | 2 | 2 | 0 | 2 | 2 | 1 | 2 | 17 |
| 6 | 3 | 1 | 1 | 2 | 2 | 1 | 0 | 1 | 1 | 2 | 14 |
| 7 | 2 | 0 | 1 | 2 | 2 | 1 | 2 | 0 | 2 | 2 | 14 |
| 8 | 3 | 1 | 1 | 2 | 2 | 2 | 2 | 1 | 0 | 3 | 17 |
| 9 | 2 | 1 | 0 | 2 | 1 | 1 | 1 | 1 | 0 | 0 | 9  |
|   | 23| 8 | 9 | 18| 13| 10| 13| 13| 10| 18|    |

COLUMN SUMS            ROW SUMS

FIG. 12

|   | 0 | 1 | 2 | 3 | 4 | 5 | 6 | 7 | 8 | 9 |    |
|---|---|---|---|---|---|---|---|---|---|---|----|
| 0 | 0.5 | 0.3 | 0.3 | 0.4 | 0.4 | 0.3 | 0.4 | 0.4 | 0.3 | 0.4 | 23 |
| 1 | 0.7 | 0.5 | 0.5 | 0.7 | 0.6 | 0.6 | 0.6 | 0.6 | 0.6 | 0.7 | 8 |
| 2 | 0.7 | 0.5 | 0.5 | 0.7 | 0.6 | 0.5 | 0.6 | 0.6 | 0.5 | 0.7 | 9 |
| 3 | 0.6 | 0.3 | 0.3 | 0.5 | 0.4 | 0.4 | 0.4 | 0.4 | 0.4 | 0.5 | 18 |
| 4 | 0.6 | 0.4 | 0.4 | 0.6 | 0.5 | 0.4 | 0.5 | 0.5 | 0.4 | 0.6 | 13 |
| 5 | 0.7 | 0.4 | 0.5 | 0.6 | 0.6 | 0.5 | 0.6 | 0.6 | 0.5 | 0.6 | 10 |
| 6 | 0.6 | 0.4 | 0.4 | 0.6 | 0.5 | 0.4 | 0.5 | 0.5 | 0.4 | 0.6 | 13 |
| 7 | 0.6 | 0.4 | 0.4 | 0.6 | 0.5 | 0.4 | 0.5 | 0.5 | 0.4 | 0.6 | 13 |
| 8 | 0.7 | 0.4 | 0.5 | 0.6 | 0.6 | 0.5 | 0.6 | 0.6 | 0.5 | 0.6 | 10 |
| 9 | 0.6 | 0.3 | 0.3 | 0.5 | 0.4 | 0.4 | 0.4 | 0.4 | 0.4 | 0.5 | 18 |
|   | 23 | 8 | 9 | 18 | 13 | 10 | 13 | 13 | 10 | 18 |    |

COLUMN SUMS

COPY OF COLUMN SUMS

|   | 0 | 1 | 2 | 3 | 4 | 5 | 6 | 7 | 8 | 9 |    |
|---|---|---|---|---|---|---|---|---|---|---|----|
| 0 | 0.5 | 0.2 | 0.2 | 0.3 | 0.2 | 0.2 | 0.2 | 0.2 | 0.2 | 0.3 | 4 |
| 1 | 0.8 | 0.5 | 0.5 | 0.7 | 0.6 | 0.5 | 0.6 | 0.6 | 0.5 | 0.7 | 19 |
| 2 | 0.8 | 0.5 | 0.5 | 0.7 | 0.6 | 0.5 | 0.6 | 0.6 | 0.5 | 0.7 | 18 |
| 3 | 0.7 | 0.3 | 0.3 | 0.5 | 0.4 | 0.3 | 0.4 | 0.4 | 0.3 | 0.5 | 9 |
| 4 | 0.8 | 0.7 | 0.7 | 0.6 | 0.5 | 0.5 | 0.5 | 0.5 | 0.5 | 0.6 | 14 |
| 5 | 0.8 | 0.5 | 0.5 | 0.7 | 0.5 | 0.5 | 0.5 | 0.5 | 0.5 | 0.7 | 17 |
| 6 | 0.8 | 0.4 | 0.4 | 0.6 | 0.5 | 0.5 | 0.5 | 0.5 | 0.5 | 0.6 | 14 |
| 7 | 0.8 | 0.4 | 0.4 | 0.6 | 0.5 | 0.5 | 0.5 | 0.5 | 0.5 | 0.6 | 14 |
| 8 | 0.8 | 0.5 | 0.5 | 0.7 | 0.5 | 0.5 | 0.5 | 0.5 | 0.5 | 0.7 | 17 |
| 9 | 0.7 | 0.3 | 0.3 | 0.5 | 0.4 | 0.3 | 0.4 | 0.4 | 0.3 | 0.5 | 9 |
|   | 4 | 19 | 18 | 9 | 14 | 17 | 14 | 14 | 17 | 9 |   |

COPY OF ROW SUMS        ROW SUMS

FIG. 14

|   | 0 | 1 | 2 | 3 | 4 | 5 | 6 | 7 | 8 | 9 |
|---|---|---|---|---|---|---|---|---|---|---|
| 0 | 0 | 0.3 | 0 | 0.3 | 0 | 0 | 0 | 0.3 | 0 | 0.3 |
| 1 | 0.7 | 0 | 0.3 | 1 | 0.7 | 0.7 | 0.7 | 1 | 0.7 | 0.7 |
| 2 | 1 | 0.7 | 0 | 0.7 | 0.3 | 0.3 | 0.7 | 0.7 | 0.7 | 1 |
| 3 | 0.7 | 0 | 0.3 | 0 | 0.3 | 0.3 | 0.3 | 0.3 | 0.3 | 0.3 |
| 4 | 1 | 0.3 | 0.7 | 0.7 | 0 | 0.3 | 0.3 | 0.3 | 0.3 | 0.7 |
| 5 | 1 | 0.3 | 0.7 | 0.7 | 0.7 | 0 | 0.7 | 0.7 | 0.3 | 0.7 |
| 6 | 1 | 0.3 | 0.3 | 0.7 | 0.7 | 0.3 | 0 | 0.3 | 0.3 | 0.7 |
| 7 | 0.3 | 0 | 0.3 | 0.7 | 0.7 | 0.3 | 0.7 | 0 | 0.7 | 0.7 |
| 8 | 1 | 0.3 | 0.3 | 0.7 | 0.7 | 0.7 | 0.7 | 0.3 | 0 | 1 |
| 9 | 0.7 | 0.3 | 0 | 0.7 | 0.3 | 0.3 | 0.3 | 0.3 | 0 | 0 |

BENCHMARKING PROGRESSIVE SYSTEMS FOR SOLVING COMBINATORIAL PROBLEMS

CROSS-REFERENCE TO RELATED APPLICATION(S)

The present application is a divisional of U.S. patent application Ser. No. 14/033,690, entitled: Benchmarking Progressive Systems for Solving Combinatorial Problems, filed on Sep. 23, 2013, which is a continuation-in-part of U.S. patent application Ser. No. 13/110,663, entitled: Method for Benchmarking Combinatorial Problems and Their Solutions, filed on May 18, 2011, now U.S. Pat. No. 8,543,524, issued on Sep. 24, 2013, the contents of all of which are incorporated herein by reference their entireties.

TECHNOLOGICAL FIELD

The present disclosure relates generally to systems for solving combinatorial problems and, in particular, to benchmarking progressive systems for solving combinatorial problems.

BACKGROUND

It is well recognized that the construction or manufacture of any building, machine or equipment, generally referred to as a project, requires the collective performance of a number of individual operations or tasks for successful completion. Resources are required, as example, personnel, trained to accomplish the task, capital equipment and other resources, supplies and component parts, which need to be procured or built. Each task requires a finite time, determined by past experience, for completion. And precedence must be followed, in that some tasks typically must be completed before other tasks in the project may begin.

Prudence requires planning and, particularly, formulation of a schedule that defines the "who," "when," "where" and "how" that is necessary for completion of the project in an orderly and efficient manner. In earlier eras, the foreman or manufacturing engineer possessed the experience, training and intellect to arrange the tasks required by the project in mind and specify which persons were to carry out the tasks, the resources and supplies required, and other necessary details. That person could also provide a reasonable estimate of the time of completion as allowed prediction of a delivery date.

As modern factory projects attained greater complexity, schedules required better definition and were more scientifically defined by persons, often now referred to as industrial engineers. With essentially pen, ink and calculator, such persons were able to search through the requirements and present the paper documents defining the tasks and the resources associated with them and to arrange the order of (sequence) tasks for completion, creating timelines of individual tasks and chronological order of the tasks commencement and completion, namely, produce a project schedule. As projects became more complex still, those scheduling techniques often proved inefficient and, while less than perfect, necessarily sufficed until the advent of automated calculating machinery, such as modern scheduling systems.

To construct a modern aircraft involves many thousands of individual tasks, a vast number of technicians and assemblers, and a large amount of resources. To prepare a schedule for such a project would likely overwhelm the genius of any person working with pen, paper and calculator and would require an inordinate amount of time for one person or even a group of people to schedule to completion with minimal errors. One should not expect that the definition of a schedule to construct an aircraft should require preparation time that exceeds the construction time of an aircraft, disregarding the realism which necessitates redefining the schedule when tasks are not completed on time as originally planned, as for example due to acts of force majeure, such as electrical failure or flood.

Further compounding the difficulty of preparing a schedule for a complex project, in the modern competitive industrial world, resources including personnel and equipment are often held to a minimum and must be allocated. Little excess personnel or equipment is available to a manufacturer. Excess resources are expensive to maintain and, if carried idle by the manufacturer for too long, results ultimately in financial collapse attributed to inefficiency. Thus, the usefulness of a schedule as an industrial tool and the benefit of efficient scheduling is well understood.

A number of scheduling systems and sequencing systems are information systems for solving complex combinatorial problems, and are often used in industry to manage the allocation of resources and personnel amongst various projects. In computational complexity theory, combinatorial optimization problems are frequently classified as "NP-hard," and in real-world applications it is impossible to calculate a truly optimal solution to an NP-hard combinatorial problem using practical quantities of computational resources for practical periods of time.

Mathematicians and computer scientists have developed various approaches for finding good solutions (as opposed to singularly-optimal solutions) for combinatorial problems such as resource-constrained project scheduling (RCPS) and the traveling salesman problem (TSP), and such approaches may frequently be applied to more than one form of combinatorial problem. A number of differing implementations of such known solution approaches have been developed for various types of industries, types of users, types of computer hardware and the like. Consequently, the marketplace for such information systems (often termed "combinatorial solvers") includes a range of competing options that have varying features, capabilities, and/or underlying solution approaches, and prospective purchasers face a need to evaluate at least a subset of those competing options prior to making a decision to use one of them.

The "quality" of a solution to a combinatorial problem may be measured in a number of different manners, and its quality may be related to the "cost" of formulating the respective solution. In scheduling a multitask project, for example, one measure of schedule quality may be the duration between start of the first scheduled task and completion (finish) of the last scheduled task, sometimes referred to as "span time" or "cycle time." One example measure of schedule cost may be the time required to complete the process of formulating a schedule, that is, for the computer to execute the algorithms and process the entered task data to generate and display the schedule, often referred to as the "execution time."

Scheduling systems, and more generally combinatorial solvers, are not created equal and vary widely in quality. Many scheduling systems either use simple methods that have low cost (e.g., low execution time), but produce schedules with inferior quality (e.g., high cycle time), or use methods that produce schedules of higher quality, but at an undesirably-high cost. These systems may, for example, produce tasks that require too much time for project completion, or require too much time to formulate the schedule.

Only in rare instances can the solution approach of any scheduling system or combinatorial solver be mathematically proven to reliably find a singularly optimal solution, so that by and large those seeking to compare the performance of solvers must benchmark candidates against one or more trial scenarios. However, benchmarking these scheduling systems or combinatorial solvers presents some unique challenges. It may therefore be desirable to have a system and method that addresses these challenges, and improves upon existing practices.

BRIEF SUMMARY

Example implementations of the present disclosure provide a system of benchmarking a scheduling system, sequencing system or other combinatorial solver configured to solve a combinatorial problem, i.e., providing an approximate description of the population of potential solutions for a given combinatorial problem. More particularly, example implementations of the present disclosure provide a system of benchmarking a progressive system for solving combinatorial problems, in which the system includes one or more sub-parts that may each operate iteratively as part of a search for a desirable solution.

Example implementations may be used to describe the performance of a combinatorial solver relative to chance. Example implementations may also be used in place of benchmark approaches which rank the output of combinatorial solvers for a single trial scenario, or even a suite of trial scenarios, to enhance the representativeness of the benchmark result with respect to different, non-benchmarked combinatorial problems of similar complexity. As will be discussed below, results produced by example implementations may be employed to estimate the cost (e.g., computational effort) to be invested in order to obtain good solutions exceeding a measurable criterion of quality, allowing for more detailed evaluations of combinatorial solvers that tend to develop solutions of similar quality. Example implementations may facilitate finding a solver that achieves solutions of a desirable quality at an acceptable cost, which may have a substantial effect on resource utilization in systems such as those for solving resource-constrained project scheduling (RCPS) or similar problems.

According to one aspect of example implementations, a system is provided for benchmarking a progressive combinatorial solver in which a combinatorial problem is described by a problem scenario. The system includes a processor programmed to implement a benchmark control, combinatorial solver module and parametric model generator. The benchmark control may be configured to initialize a parametric model collector. The combinatorial solver module may be configured to perform a plurality of parametric trials associated with respective numbers of sub-part iterations of the progressive combinatorial solver.

According to this aspect, the combinatorial solver module includes a solver control, progressive combinatorial solver and statistical model generator configured to perform a number of operations for each of the plurality of parametric trials. The solver control may be configured to initialize a statistical data collector. The progressive combinatorial solver may be configured to perform a plurality of randomized executions with a respective number of sub-part iterations, including being configured to find respective solutions to the combinatorial problem, and add data including metric values for the respective solutions (sometimes referred to as solution metric values) to the statistical data collector. The statistical model generator may be configured to determine one or more statistical parameters of data in the statistical data collector, and add data including an indication of the respective number of sub-part iterations, a cost of finding the metric values for the respective solutions, and the statistical parameters of the trial to the parametric data collector.

The parametric model generator, then, may be configured to determine a best-fit model from data in the parametric data collector, with the best-fit model relating solution metric value (e.g., its mean and/or standard deviation) to cost for numbers of sub-part iterations of the progressive combinatorial solver. In some examples, the best-fit model may be a polynomial function of cost, a logarithmic or exponential function of cost, or a statistical function of cost.

In some examples, the system may further include a comparative model evaluator configured to utilize the best-fit model. For example, the comparative model evaluator may be configured to utilize the best-fit model to determine a most likely metric value for a given cost, determine a most likely cost for a given metric value, or determine a probability of a given metric value for a given cost, for each of one or more numbers of sub-part iterations.

In some examples, the comparative model evaluator may be configured to utilize the best-fit model and a second best-fit model to compare the progressive combinatorial solver and a second progressive combinatorial solver.

In some further examples, the second progressive combinatorial solver may be a baseline progressive combinatorial solver. In these further examples, the comparative model evaluator being configured to utilize the best-fit model may include being configured to plot the best fit model and second best-fit model to enable a visual determination of whether the progressive combinatorial solver is better than, worse than or otherwise comparable to the second progressive combinatorial solver.

In some further examples, the comparative model evaluator being configured to utilize the best-fit model may include being configured to compare solution metric values of the best-fit model and second best-fit model at a given cost to determine whether the progressive combinatorial solver is better than, worse than or otherwise comparable to the second progressive combinatorial solver at the given cost.

In some further examples, the comparative model evaluator being configured to utilize the best-fit model may include being configured to compare slopes or derivatives of the best-fit model and second best-fit model determine whether a rate of improvement of the progressive combinatorial solver is better than, worse than or otherwise comparable to the rate of improvement of the second progressive combinatorial solver.

In some further examples, the comparative model evaluator being configured to utilize the best-fit model may include being configured to compare asymptotes of the best-fit model and second best-fit model determine whether limiting behavior of the progressive combinatorial solver is better than, worse than or otherwise comparable to the limiting behavior of the second progressive combinatorial solver.

According to another aspect of example implementations, a system is provided for scheduling tasks that collectively complete a project, where the tasks have respective start times and completion times. The system includes a processor programmed to implement a parameter calculator, sorter and shifter configured to perform one or more iterations of a process for optimizing a tentative schedule. For each of the iteration(s), the parameter calculator may be configured to set a completion time boundary equal to or later than a latest of the completion times, and a commencement time boundary not later than an earliest of the start times. Also for each of the iteration(s), the sorter may be configured to sort the tasks according to one or more keys to derive a temporary listing of scheduled tasks. The key(s) may be the same or different between iterations. For at least one of the iteration(s), though, the sorter may be configured to sort the tasks other than in chronological order by start time, or reverse chronological order by completion time.

Also according to this other aspect, and again for each of the iteration(s), the shifter may be configured to shift the scheduled tasks of the temporary listing towards either the commencement time boundary or the completion time boundary, commencing with one of the scheduled tasks and continuing in sorted order to a last of the scheduled tasks. In this regard, the shifter may be configured to individually unschedule and then reschedule each task to a new start time as close to the commencement time boundary as possible, or to a new completion time as close to the completion time boundary as possible, without violating a constraint of the scheduled tasks, to generate a revised temporary listing of scheduled tasks to be implemented to complete the project.

According to yet another aspect of example implementations, a system is provided for sequencing a plurality of items. The system includes a solution store configured to store a plurality of sequences of the items, and a processor programmed to implement a selector, register, accumulator and generator configured to perform a plurality of iterations of a process for generating a new sequence of the items. For each of the iterations, the selector may be configured to subject the sequences stored by the solution store to a weighted evaluation in which the sequences are weighted and compared according to respective measures of efficacy with respect to some predetermined selection criteria, and the selector may be configured to select some or all of the respective sequences based on the weighted evaluation. Also for each of the iterations, the register may be configured to store the selected sequences, the accumulator may be configured to effect a statistical treatment of the selected sequences stored by the register, and the generator may be configured to employ the statistical treatment to generate a new sequence. For at least one of the iterations, the solution store may be configured to further store the new sequence along with a respective measure of efficacy. And for at least one of the iterations, the selector may be configured to select a higher-weighted one of the sequences stored by the solution store to displace a lowest-weighted one of the sequences stored by the register.

In other aspects of example implementations, a method and computer-readable storage medium are provided for benchmarking a progressive combinatorial solver. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 5-15 are schematic diagrams of representations of sequences and data stored in an accumulator of an example sequencing system, according to example implementations of the present disclosure;

Figure 1:
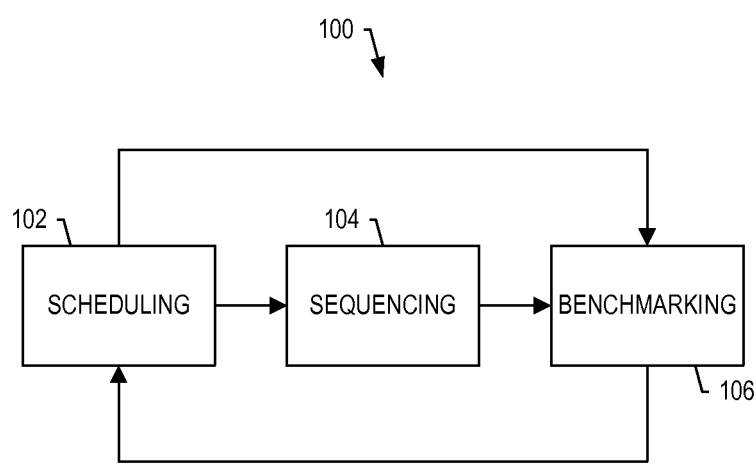
FIG. 1 is an illustration of a combinatorial-optimization system in accordance with an example implementation.

FIGS. 18-21 illustrate graphs of empirical data and models that may be generated by a benchmarking system for comparing variations of a scheduling system, according to example implementations of the present disclosure; and FIGS. 22-25 illustrate graphs of empirical data and models that may be generated by a benchmarking system for comparing five combinatorial solvers including a sequencing system, according to example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being above something else (unless otherwise indicated) may instead be below, and vice versa; and similarly, something shown or described as being to the left of something else may instead be to the right, and vice versa. Like reference numerals refer to like elements throughout.

Example implementations of the present disclosure relate generally to systems for solving combinatorial problems and, in particular, to benchmarking progressive systems for solving combinatorial problems. Example implementations will be primarily described in conjunction with combinatorial solvers such as those for solving problems such as resource-constrained project scheduling (RCPS), the traveling salesman problem (TSP), the knapsack problem, the stock cutting problem, and the like. And more particularly, example implementations may be described in conjunction with scheduling systems for scheduling tasks that collectively complete a project such as construction or manufacture of a building, machine or equipment (e.g., an aircraft), which may be one form of RCPS. It should be understood, however, that example implementations may be utilized in conjunction with a variety of other combinatorial solvers or combinatorial problems, such as those identified above.

To illustrate the operational and financial impact of example implementations of the present disclosure, consider the economics of the manufacturing enterprise. Modern industry typically combines resources such as capital-intensive equipment, the labor of large groups of people, and various third-party supplies to manufacture a finished product. The competitive position of each business may be determined in part by how much work can be accomplished each day, making efficient use of available resources. But equipment and people cannot be kept continuously busy. For example, during a manufacturing shift, a milling machine may spend the majority of its time operating and visibly performing value-added work, yet there may be other times when operations are suspended for necessary reconfiguration or maintenance, and still other times when the machine is simply idle, waiting for an operator to become available or for material to arrive.

The ratio between value-added operating hours and total possible operating hours is a standard measure of resource utilization. For example, if the milling machine is available eight hours per shift, but performs only six hours of valued-added work per shift, then its resource utilization is 75%. If rescheduling permits seven hours of valued-added work per shift with only one hour of reconfiguration and/or idle time, then its resource utilization is improved to 87.5%. Improvements to resource utilization have two benefits. First, they generally decrease the business cost of a finished product, allowing for improved product pricing and/or profit. Second, they generally decrease manufacturing cycle time, enabling increased product production per unit time with existing levels of equipment and labor.

In order to maximize the efficiency of their operations, manufacturing enterprises typically schedule work in advance in order to keep their most-valuable resources continuously engaged in value-added work. By itself scheduling may not maximize resource utilization, but scheduling combined with well-defined management practices and disciplined execution may have a substantial effect on overall resource utilization.

Referring now to FIG. 1, a combinatorial-optimization system 100 is illustrated according to example implementations of the present disclosure. The system may include any of a number of different subsystems (each an individual system) for performing one or more functions or operations. As shown, for example, the system may include one or more scheduling systems 102, one or more sequencing systems 104, and/or a benchmarking system 106. Although shown as part of the combinatorial-optimization system, one or more of the scheduling system, sequencing system and/or benchmarking system may instead be separate from but in communication with the combinatorial-optimization system. It should also be understood that one or more of the subsystems may function or operate as a separate system without regard to others of the subsystems. And further, it should be understood that the combinatorial-optimization system may include one or more additional or alternative subsystems than those shown in FIG. 1.

The combinatorial-optimization system 100 of example implementations is generally configured to solve a combinatorial problem, such as scheduling tasks that collectively complete a project such as construction or manufacture of a building, machine or equipment. Although example implementations of the present disclosure may adopt the terminology of tasks and project, other terminology may be used such as that provided above. In another example, tasks may be referred to as "activities," and the project may be referred to as the "task." In yet another example, the tasks may be referred to as "nodes," and the project may be referred to as a "principal node."

The scheduling system 102 may be generally configured to schedule tasks that collectively complete a project, or otherwise optimize a tentative schedule for performing scheduled tasks that collectively complete a project. In some examples, the scheduling system may perform one or more iterations of a process for optimizing a schedule for a plurality of tasks each of which may have a start time, completion time, identification (or identifier) and/or resource requirements. Each of the iterations may include determining the latest completion time and earliest start time in the plurality of tasks, and defining (or setting) a completion time boundary equal to or later than the latest completion time, and a commencement time boundary not later than the earliest start time in the plurality of tasks.

In the scheduling system 102, beginning with the tentative schedule, each of the iterations may include sorting the tasks according to one or more keys to derive a temporary listing of scheduled tasks. For example, the tasks may be sorted according to any of the following keys: in chronological order by start time, reverse chronological order by completion time, increasing or decreasing duration, slack time, or number of predecessor or successor tasks. In other examples, the tasks may be randomly or pseudo-randomly (generally "randomly") sorted. And each iteration may include performing a shift process for shifting tasks towards the commencement time boundary (left shift) or completion time boundary (right shift), commencing with one of the tasks and continuing in sorted order to the last task.

The process for shifting tasks towards the commencement time boundary may include individually unscheduling and then rescheduling each task to a new start time as close to the commencement boundary as possible, and a new completion time based on duration of the respective task, to generate a revised temporary listing of scheduled tasks to be implemented to complete the project. Likewise, the process for shifting tasks towards the completion time boundary may include individually unscheduling and then rescheduling each task to a new completion time as close to the completion time boundary as possible, and a new start time based on duration of the respective task, to generate a revised temporary listing of scheduled tasks to be implemented to complete the project. In either instance, each task may be individually unscheduled and then rescheduled to respective new time(s) without violating any constraint of such tasks, such as an order of their performance.

The sequencing system 104 of the combinatorial-optimization system 100 may be generally configured to sequence or order a plurality of items such as tasks in a project, or otherwise optimizing a sequential arrangement of items with respect to a predetermined evaluation. In this regard, a sequence may be construed to mean "order," such as may be realized in a schedule of tasks. A sequence may also apply to the ordering of input to a combinatorial solver such as the scheduling system 102. A different ordering of input may result in a different output sequences unless the solver deterministically internally reorders the input as a first step (e.g., a lexical sort over a unique key).

In some examples, the sequencing system 104 may include a solution store configured to store a plurality of sequences including a plurality of initial sequences (and subsequently-generated new sequences). The sequencing system may perform a plurality of iterations where for each iteration, the sequencing system may subject the sequences stored by the solution store to a weighted evaluation in which the sequences may be weighted and compared according to respective measures of efficacy with respect to some objective function that may be used as or as part of some predetermined selection criteria. The sequencing system may select some or all of the respective sequences based on the weighted evaluation. The sequencing system may include a register configured to store the selected sequences, and an accumulator configured to effect a statistical treatment of the stored sequences.

The sequencing system 104 may employ the statistical treatment to generate a new sequence, which in some examples may be improved such as by application of the scheduling system 102. The new sequence may be evaluated and for at least one of the iterations, may be further stored by the solution store along with an associated measure of efficacy of the new sequence. Also for at least one of the iterations, the sequencing system may select a higher-weighted of the sequences stored by the solution store for displacing a lowest-weighted of the sequences stored by the register. The accumulator may then again effect the statistical treatment of the sequences then-stored in the register such that the sequencing system iteratively generates a new sequence, until a most-aligned-sequence-yet-received sequence provides a desired sequence optimization. This most-aligned-sequence-yet-received sequence may be the sequence that is most aligned with the objective of the sequence optimization.

The benchmarking system 106 may be generally configured to benchmark one or more combinatorial solvers such as those for solving problems such as RCPS, TSP, the knapsack problem, the stock cutting problem, and the like. And more particularly, example combinatorial solvers may include one or more scheduling systems, sequencing systems and the like. Combinatorial solvers such as the scheduling system 102 and sequencing system 104 may include one or more sub-parts that may operate iteratively as part of a search for a desirable solution. Such combinatorial solvers may be generally characterized as "progressive," and they may come in many forms such as branch-and-bound solvers, random search, tabu search, genetic solvers and the like.

A combinatorial solver may be generally executed to find a solution (e.g., schedule, sequence) that may have some metric value (e.g., cycle time) that indicates a quality of the solution. And the metric value of a solution may be related to a cost (e.g., execution time) of finding the respective solution. More particularly, in some examples, the mean ($\mu$) and/or standard deviation ($\sigma$) of the metric value may be related to cost.

The performance of progressive combinatorial solvers may be determined by the number of iterations for which their sub-parts are operated. If operated for only a few iterations, the solutions found may be less desirable. If operated for greater numbers of iterations, the solutions found may be more desirable. However, progressive combinatorial solvers generally suffer from the law of diminishing return in that as the number of iterations increases, the rate at which more desirable solutions are found declines. Generally, though, progressive combinatorial solvers generate a series of solutions that are more and more desirable, with more and more cost. In a number of examples described herein, solutions with smaller metric values may be considered more desirable. In other examples, solutions with larger metric values may be considered more desirable. With corresponding changes to the objective, sorting, selecting, and other operations, example implementations of the present disclosure may have equal value to both.

The benchmarking system 106 of example implementations may be configured to benchmark one or more progressive combinatorial solvers each of which may include sub-parts that are iteratively operated as part of the search for a desirable solution as measured by an appropriate metric value of the respective solution. The benchmarking system may enable reliable, effective configuration of progressive combinatorial solvers by adjusting the number of iterations for which the sub-parts are operated to yield a desirable balance between cost (e.g., execution time as determined by the number of sub-part iterations) and solution metric value.

The benchmarking system 106 of example implementations may be configured to determine a distribution of solutions that may be found after a given number of sub-part iterations of a progressive combinatorial solver. When this analysis is repeated, considering first a few iterations, and then more, and then more still, a mathematical pattern may emerge that embodies the characteristics of the progressive combinatorial solver.

The benchmarking system 106 may be configured to benchmark one or more progressive combinatorial solver in which a combinatorial problem may be described by a problem scenario including predetermined trial scenario data. These solvers may at times include a baseline progressive combinatorial solver, one or more subject (or candidate) progressive combinatorial solvers or the like. In some examples, the problem scenario including predetermined trial scenario data may be applied to the solver. The benchmarking system may perform a plurality of parametric trials (for i=1 to a number of parametric trials) and collect data in a parametric data collector, which may be initialized beforehand.

The parametric trials may be associated with respective numbers of sub-part iterations of the progressive combinatorial solver ($j_i$=the number of sub-part iterations for parametric trial i). For each parametric trial (i), the benchmarking system 106 may initialize a statistical data collector, and perform a plurality of randomized executions (for k=1 to a number of randomized executions) of the progressive combinatorial solver with a respective number of sub-part iterations ($j_i$). For the randomized executions, the benchmarking system may find respective (most-desirable) solutions, and calculate and add data including metric values for the respective solutions to the statistical data collector. The benchmarking system may determine one or more statistical parameters of data in the statistical data collector, and add data including an indication of the number of sub-part iterations ($j_i$), the cost of finding the metric values for the respective solutions, and the statistical parameters of the trial (i) to the parametric data collector.

After performing the plurality of parametric trials, the benchmarking system 106 may determine a best-fit (parametric) function or model from the respective data, the best-fit model relating solution metric value to cost for numbers of sub-part iterations. The benchmarking system may then utilize the best-fit model in a number of different manners. For example, the benchmarking system may utilize the best-fit model and those for other progressive combinatorial solvers to compare their relative quality of solving the problem scenario. In other examples, the benchmarking system may utilize the best-fit model to determine a solution metric value (e.g., most-likely solution metric value) for a given cost, determine a cost (e.g., most-likely cost) for a given solution metric value, for each of one or more numbers of sub-part iterations, and/or determine the probability of a given metric value for a given cost.

Figure 2:
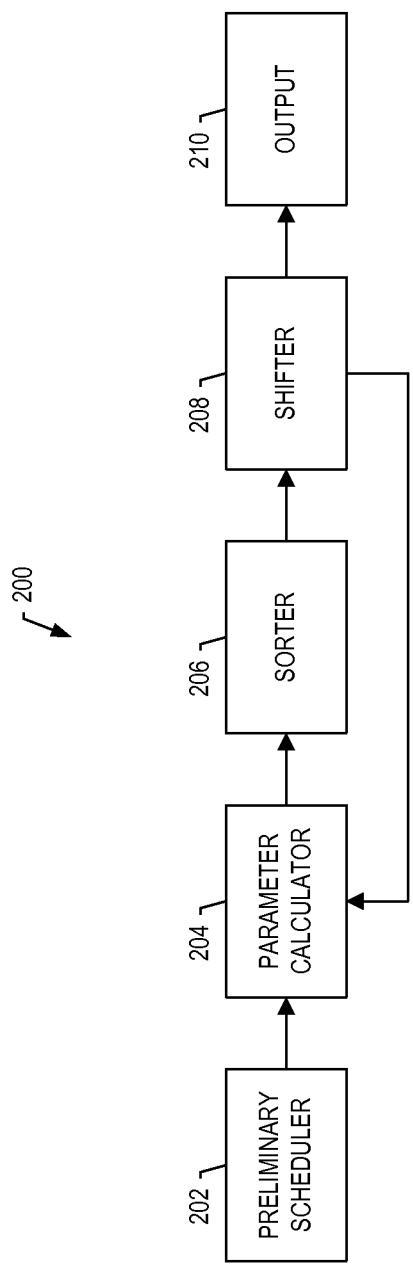
FIGS. 2, 3 and 4 illustrate a suitable scheduling system, sequencing system and benchmarking system, respectively, according to example implementations of the present disclosure.
Figure 3:
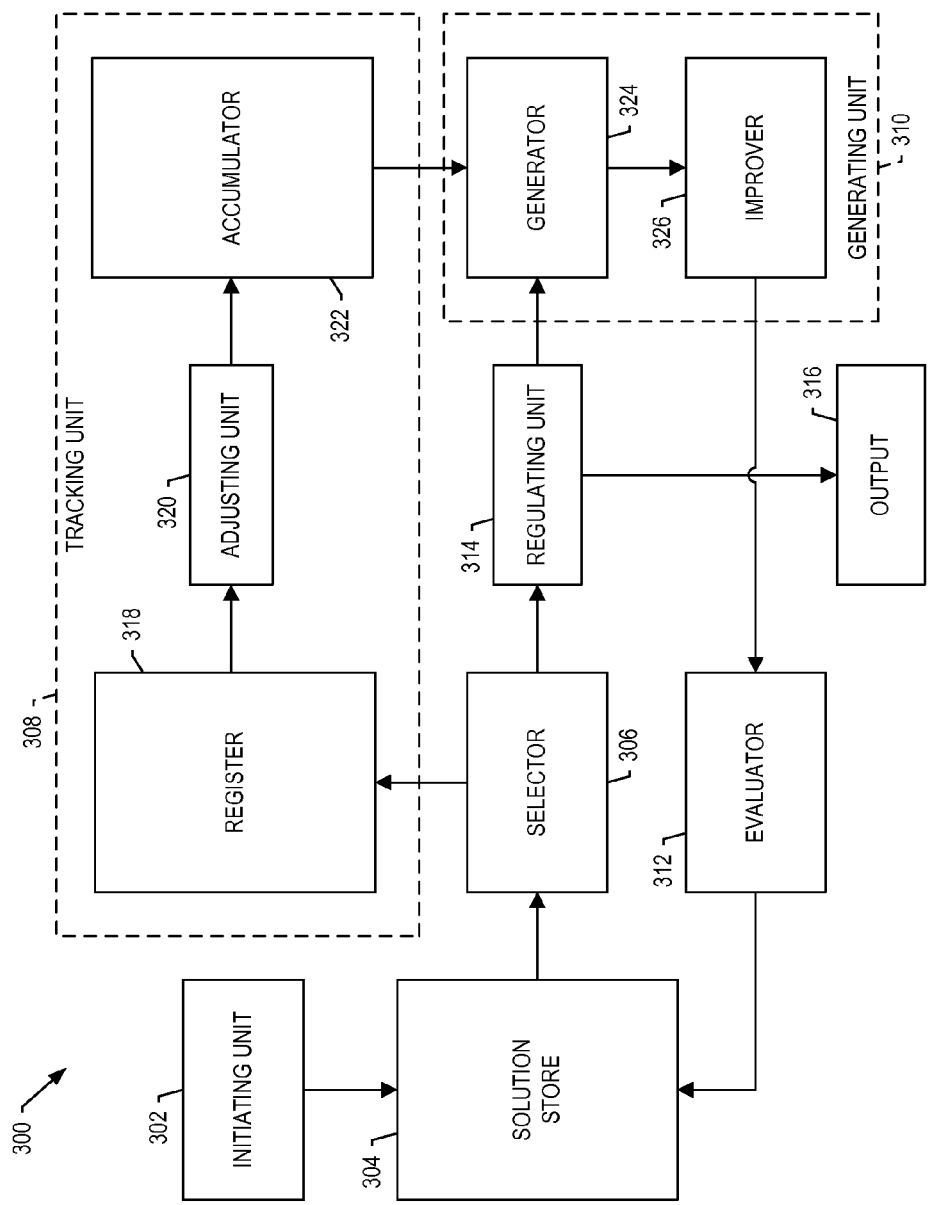
Figure 4:
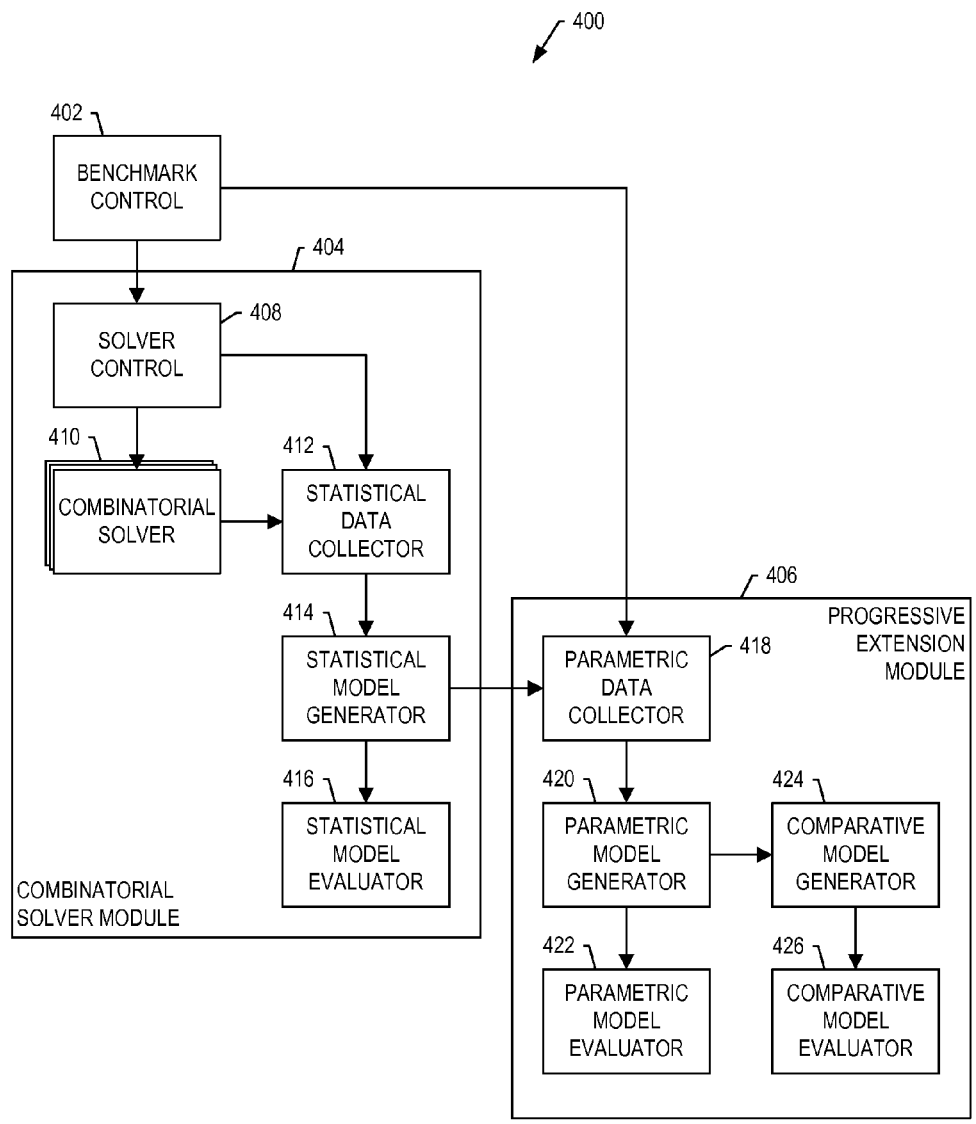

FIGS. 2, 3 and 4 illustrate examples of a suitable scheduling system 102, sequencing system 104 and benchmarking system 106, respectively, according to example implementations of the present disclosure.

FIG. 2 illustrates a scheduling system 200, which in some example implementations of the present disclosure may correspond to the scheduling system 102 of FIG. 1. As indicated above and explained in greater detail below, the scheduling system may be generally configured to schedule tasks that collectively complete a project, or otherwise optimize a tentative schedule for performing scheduled tasks that collectively complete a project. Or even more generally, the scheduling system may be generally configured to solve a combinatorial problem.

According to example implementations, the scheduling system 200 may include a certain number of minimum requirements. The scheduling system may be configured to schedule tasks selectively according to one or more keys. In example implementations described in greater detail below, the tasks may be sorted in chronological order by start time, or reverse chronological order by completion (finished) time, but other additional or alternative keys are possible. In other examples, the tasks may be sorted by increasing or decreasing duration, slack time, number of predecessor or successor tasks, or the like. And in yet other examples, the tasks may be randomly sorted.

The scheduling system 200 may be configured to construct schedules forward in time (often referred to as a "forward mode") and backward in time (often referred to as a "backward mode"). The scheduling system may be configured to act upon each task in a sorted order (or sequence) of tasks (i.e., tasks given in a defined order from first to last), without modifying the given order of the tasks. And the scheduling system may be configured to apply scheduling operations, unscheduling operations, rescheduling operations and the like to the sorted order of tasks.

As shown in FIG. 2, the scheduling system 200 may include a preliminary scheduler 202, parameter calculator 204, sorter 206, shifter 208 and output locus 210. The preliminary scheduler may be configured to receive task data for a plurality of tasks that collectively complete a project, and resource data for resources that perform the tasks; and the preliminary scheduler may be configured to construct a tentative schedule for the tasks based on the task data and resource data. In some examples, the task data may include for each task, identification of the task (I) (e.g., as "install pilot seat"), task duration (D), the required resources (R), and the precedent constraints (P) applicable to the task.

As an example, one constraint may be that a certain task must be performed before another, a precedent constraint, such as (in the manufacture of an aircraft) the pilot's seat must be installed prior to installation of the pilot's overhead window or canopy. Thus before the canopy installation task can start, the preliminary scheduler 202 may look to determine whether the seat installation task is scheduled for completion, and only then assign a start time for the canopy installation task. The preliminary scheduler may ensure that the assignment of start time and completion time for each task in the project is consistent with and does not violate an applicable task priority constraint.

The resource data may include an inventory of available resources (RI) such as the manufacturing equipment, tools, human resources and skills, and may include the inventory in kind and quantity. The resource data may enable the preliminary scheduler 202 to allocate all available resources to the various tasks. In the event that a quantity (number) of available resources is insufficient in quantity to allow simultaneous accomplishment of all tasks, the preliminary scheduler may schedule the quantity of such resources as are available amongst the various tasks requiring the resource, in some order according to any number of different techniques. The preliminary scheduler may also ensure that the time allocations assigned to such resource for a task does not conflict with another task. That is, the preliminary scheduler may assign the resource to tasks without violating a resource constraint.

The preliminary scheduler 202 may be configured to process the task data and resource data in accordance with any of a number of known scheduling techniques, and following expiration of some "execution time," produce a preliminary or tentative schedule (Sch1), which may be generally visualized by its individual elements as follows:

| | |
|---|---|
| (1) Task A | S1, C1, D1, R1, P1, I1 |
| (2) Task B | S2, C2, D2, R2, P2, I2 |
| ... | |
| (N) Task n | Sn, Cn, Dn, Rn, Pn, In |

Here, S, C, D, R, P and I may refer to the start time, completion time, duration, resource information, precedence information and task identification, respectively. In this representation, the order of the tasks may vary and not necessarily correspond to the order of the start times or completion times. As explained below, the order of the tasks may be explicitly determined by various sorting operations of the sorter 206.

From among the tasks in the project, the tentative schedule (Sch1) may include a task that begins no earlier than any other task in the project, the earliest start time. The schedule also includes another task that ends no later than any other task in the project, the latest completion time. The difference between these two times may define the cycle time for the project. In some examples, it may be assumed that the tentative schedule has a "good" cycle time (one that appears reasonable), and that the preliminary scheduler 202 has a reasonable execution time for producing the tentative schedule. As explained in greater detail below, the parameter calculator 204, sorter 206 and shifter 208 may operate to improve the cycle time of the tentative schedule, and thereby improve its quality.

The parameter calculator 204 may be configured to receive the tentative schedule (Sch1), and calculate or otherwise identify the latest completion time for any of the tasks listed in the tentative schedule (Sch1) and set that completion time (C) as the right boundary (Cc). The parameter calculator may also be configured to identify the earliest start time for any of the listed tasks in Sch1 and set that start time (S) as the left boundary (Ss). The parameter calculator may automatically set these boundaries, or in some examples, the parameter calculator may receive one or more of the boundaries such as from a user.

The sorter 206 may be configured to sort the listed tasks in the tentative schedule (Sch1) according to one or more keys, thereby producing a temporary schedule. The sorter may then communicate with the shifter 208 to accomplish a right-shifting or left-shifting operation (generally a shifting operation) with respect to the temporary schedule, which may produce another temporary schedule. This sort-shift process of the sorter and shifter may repeat for one or more iterations for the same or different key(s), which may yield a schedule accepted by the scheduling system 200 as the optimized schedule. For each iteration, the parameter calculator 204 may set the latest completion time of the tasks as the right boundary (Cc), and the earliest start time as the left boundary (Ss). One suitable example implementation is described below in which the key(s) include start time (S) and completion time (C).

In some examples, the sorter 206 may sort the listed tasks in the tentative schedule (Sch1) in chronological order by C to produce a chronological listing by completion time (Sch2). This listing (Sch2) may represent a temporary schedule, and its tasks may be the same in number (n) as in the Sch1 but more likely in a different order. A different representation may therefore be given for the tasks in Sch2. It should be understood, however, that each task in Sch1 may find a counterpart in the tasks of Sch2. For example, a Task B of Sch1 may find a counterpart in a Task AS of Sch2, assuming only for purpose of illustration that the sort procedure reversed the positions of the first two tasks in the tentative schedule. The forgoing convention is used for each of the listings hereafter described.

The sorter 206 may communicate with the shifter 208 to accomplish a shifting operation. For example, working in reverse chronological order in the chronological listing, starting with the last task in the list, that is, from the task with the latest completion time, the shifter may "right shift" each task as much as is permissible to the right completion time boundary. That is, the shifter may individually unschedule and then reschedule each task to start and finish (complete) as late as possible prior to or at the right time boundary (Cc), without violating any of the applicable constraints and requirements associated with the respective task. In making this shift and evaluating for resource conflicts, the shifter may consider each task's duration, and, hence, the new start time as would be assigned to the respective task.

The foregoing shifting operations may be accomplished by use of the capability of the scheduling system 200, which may have the ability to perform individual unscheduling and then rescheduling operations. In this regard, the scheduling system may have the ability to schedule (or reschedule) tasks either as early as possible (sometimes referred to as "forward" scheduling), or as late as possible (sometimes referred to as "backward" scheduling).

The shifter 208 may thus assign each task a new completion time (C), and may assign the task a new start time (S) based on the task data regarding the task's duration (D). It should also be noted that the "order" of the tasks in the "right shifted" task listing may remain unchanged from the order in which those tasks appeared in the prior sort operation. However, the tasks may likely no longer be in chronological order as before, as a consequence of any reassignment of completion times. This task listing (Sch3), another temporary schedule of itself, may be represented as follows:

| (1) Task AS | W1 (S, C, D, R, P, I) |
| (1) Task BS | W2 (S, C, D, R, P, I) |
| ... | |
| (N) Task nS | Wn (S, C, D, R, P, I) |

In some examples, the foregoing sort may also be accomplished by reversing the listing, an equivalent, by sorting the tentative schedule (Sch1) in reverse chronological order by completion time, and then selecting the first task in the list, which would then hold the latest completion date, and right shifting the first task in such listing for undergoing unscheduling and rescheduling, and continuing down through the task listing.

The shifter 208 may be configured to perform the foregoing rescheduling in any of a number of different manners. For a number of examples of suitable methods, as well as further information more generally regarding aspects of the scheduling system 200, see U.S. Pat. No. 5,890,134, entitled: Scheduling Optimizer, issued on Mar. 30, 1999, the content of which is incorporated by reference in its entirety.

In some examples, the sorter 206 may again sort the various tasks listed in the "right shifted" task listing or temporary listing (Sch3), this time into chronological order by the respective start times (S) to obtain another chronological listing (Sch4), which similar to before may represent a temporary schedule. The first task in Sch4 may have the earliest start time (S), and the last or "nth" task may have the latest start time. This sorted listing (Sch4) may be represented as follows:

| (1) Task AT | X1 (S, C, D, R, P, I) |
| (1) Task BT | X2 (S, C, D, R, P, I) |
| ... | |
| (N) Task nT | Xn (S, C, D, R, P, I) |

Working in order in the list starting with the first task in the list, that is, with the task having the earliest start time, the shifter 208 may "left shift" each task as much as possible toward the start time boundary. That is, the shifter may individually unschedule and then reschedule each task to occur at or as early as possible, but no earlier than the left or start time boundary or shortly thereafter, as desired, without violating any of the applicable constraints and requirements associated with the respective task. The shifter may thus assign each task a new start time (S), and may assign the task a new completion time (C) based on the task data regarding the task's duration (D). This creates a new listing, the "left shifted" task listing or schedule (Sch5), in which the tasks may be maintained in the order set in the prior chronological listing.

This additional listing (Sch5), which in itself is a schedule, may be represented as follows:

| (1) Task AU | Y1 (S, C, D, R, P, I) |
| (1) Task BU | Y2 (S, C, D, R, P, I) |
| ... | |
| (N) Task nU | Yn (S, C, D, R, P, I) |

As in the case of the right shifting, the shifter 208 may be configured to perform the foregoing left shifting in any of a number of different manners. For a number of examples of suitable methods, see the aforementioned '134 patent.

In some examples, the scheduling system 200 may accept the new schedule (Sch5) as the optimized schedule. In other examples, better quality schedules may be produced by performing multiple repetitions or iterations of the sort-shift operations, and in any order or combination of right-shifting and/or left-shifting operations. Since the scheduling system may be designed to take an existing schedule, and by packing left and/or right, improve it, the scheduling system may take the result of a first application of the process as the input to a second application of the process, and take the output of a second iteration and use it as the input to a third iteration, and so on. Regardless of the number of iterations, the scheduling system may be further configured to present the optimized to the output locus 210, at which the optimized schedule may be handled in a number of different manners. For example, the optimized schedule may be stored in appropriate storage or memory, presented by an appropriate display, provided or otherwise communicated to another system (e.g., sequencing system 104), or the like.

As indicated above, the scheduling system 200 may be configured to schedule tasks selectively according to one or more keys such as in chronological order by start time (S), or reverse chronological order by completion (finished) time (C). But in some examples, the scheduling system may use one or more additional or alternative keys, such as increasing or decreasing duration (D), slack time, or number of predecessor or successor tasks.

In a first variation, for example, the sorter 206 and shifter 208 may perform two sort-shift iterations in which the first iteration includes chronological sorting (by start time) and right shifting, and the second iteration includes reverse-chronological sorting (by completion time) and left shifting.

In a second variation, for example, the sorter 206 and shifter 208 may perform four sort-shift iterations in which the first iteration includes randomly sorting and right shifting, the second iteration includes reverse-chronological sorting and right shifting, the third iteration includes randomly sorting and left shifting, and the fourth iteration includes chronological sorting and left shifting.

In a third variation, for example, the sorter 206 and shifter 208 may perform six sort-shift iterations in which the first iteration includes randomly sorting and right shifting, the second iteration includes randomly sorting and right shifting, and the third iteration includes reverse-chronological sorting and right shifting. In this other example, the fourth iteration includes randomly sorting and left shifting, the fifth iteration includes randomly sorting and left shifting, and the sixth iteration includes chronological sorting and left shifting.

In fourth variation, for example, the sorter 206 and shifter 208 may perform six sort-shift iterations in which the first iteration includes randomly sorting and right shifting, the second iteration includes randomly sorting and left shifting, and the third iteration includes reverse-chronological sorting and right shifting. In this other example, the fourth iteration includes randomly sorting and left shifting, the fifth iteration includes randomly sorting and right shifting, and the sixth iteration includes chronological sorting and left shifting.

In yet another example, the scheduling system 200 may receive or otherwise compute the slack time for each task, and then sort by two keys before right shifting, first, sorting by increasing slack time, and then sorting in reverse chronological order; then if two tasks complete at the same time, the one with the least slack time may be shifted first. The scheduling system may apply this additional sort key on both right and left shifts, and obtain greater schedule improvement than by just sorting by completion and start times. In this regard, tasks with less slack time are often considered more critical, and by giving those tasks priority in the shifting process, they may tend to shift into better locations on the schedule. And since they may be more critical, they have more influence over the resulting cycle time.

In some examples, the scheduling system 200 or more particularly its parameter calculator 204 may be configured to calculate or otherwise determine the slack time associated with a task, such as by twice performing right and left shifts. The first time may squeeze out the majority of the excess cycle time. Then during the second pack, the scheduling system may obtain a very clear measure of slack time by carefully recording how much a task moves during the left shift. In this regard, each task may be shifted as far right as possible and then on the left pass, shifted as far left as possible. Anything that is truly critical will not move. Other tasks will move either a little or a lot.

Moreover, the scheduling system 200 need not process all of the tasks of a project for each of the iterations. In some examples, the scheduling system may individually unscheduled and reschedule only a subset of the tasks of a project, such as within the context of a larger unaltered schedule and its propagated side-effects. Also, in some examples, the scheduling system may left/right shift a first subset of the sorted tasks during an iteration, and then switch the direction and right/left shift another, second subset of the sorted tasks (where the first and second subsets may have the same or different numbers of tasks, and be all or fewer than all of the tasks of a project). This switching may occur one or more times over the course of an iteration, and may occur for one or more iterations in the same or different manners.

FIG. 3 illustrates a sequencing system 300, which in some example implementations of the present disclosure may correspond to the sequencing system 104 of FIG. 1. The sequencing system may be generally configured to sequence or order a plurality of items such as tasks in a project, or otherwise optimizing a sequential arrangement of items with respect to a predetermined evaluation or evaluating algorithm. When the sequencing system is used in conjunction with a scheduling system (e.g., scheduling system 102), the sequence may be of tasks indicating the order in which the scheduling system may perform its scheduling operations. As shown, the sequencing system may include a number of elements coupled to one another to carry out functions of the sequencing system. As shown, the sequencing system may include an initiating unit 302, solution store 304, selector 306, tracking unit 308, generating unit 310, evaluator 312, regulating unit 314 and output locus 316. The tracking unit may include a register 318, adjusting unit 320 and accumulator 322, and the generating unit may include a generator 324 and improver 326.

The initiating unit 302 may be configured to provide a predetermined number of initial sequences to begin an optimizing process. The initiating unit may provide the initial sequences to the solution store 304 where the initial sequences may be stored with subsequently-generated new sequences (as explained below). The selector 306 may subject the initial sequences (or more generally the sequences in the solution store) to a weighted evaluation in which the initial sequences may be weighted and compared according to respective measures of efficacy (or alignment) with respect to some objective function that may be used as or as part of some predetermined selection criteria. Each of the initial sequences (and more generally sequences in the solution store) may therefore be weighted and compared according to their weights, from a highest weighted sequence to a lowest weighted sequence. In some examples, the selection criteria may include a measure of statistical similarity or dissimilarity of between sequences, or an order in which the sequences are provided to the solution store, a ranking of best sequences as measured according to some indication of quality, or the like.

The selector 306 may select some or all of the respective sequences based on the weighted evaluation. For example, the selector may select the m most-statistically-similar or least-statistically-similar sequences, the last m sequences provided to the solution store, the m best sequences or the like. The selector may then provide these selected sequences to the tracking unit 308, and more specifically, deliver the selected sequences to the register 318. The tracking unit may store the selected sequences in the register. The register may employ the adjusting unit 320 to provide the respective sequences to the accumulator 322. And the tracking unit may effect a statistical treatment of the respective sequences, specifically employing the accumulator.

The generating unit 310 may employ the statistical treatment provided by the accumulator 322 to generate an initial new sequence, specifically employing the generator 324. The improver 326 may be configured to improve the initial new sequence generated by the generator to present a new sequence to the measuring unit 308; although if desired, the improver may be eliminated so that the initial new sequence presented by the generator may be presented to the measuring unit as a new sequence. In some examples, the improver may include a scheduling system such as the scheduling system 100 of FIG. 1, which may be used to determine a possibly better sequence, and to which again the scheduling system 200 of FIG. 2 may correspond in some example implementations.

The evaluator 312 may be configured to evaluate the new sequence according to the predetermined evaluating algorithm, and may generate a measure of efficacy of the new sequence with respect to the aforementioned objective function that may be used as or as part of the predetermined selection criteria. The new sequence and its measure of efficacy may be provided to the solution store 304 for storage along with the initial sequences. The selector 306 and register 318 may then cooperate to ascertain whether the new sequence is appropriate for storage in the register and statistical treatment by the accumulator 322. A new sequence may be appropriate for storage in the register and statistical treatment by the accumulator when the new sequence is different from and higher weighted than the sequences stored in the register (e.g., as measured by the measure of efficacy with respect to the predetermined selection criteria).

In some examples, the register 318 may be limited to storage of a predetermined number of sequences that may be treated by the accumulator 322. In these examples, the register may add higher weighted sequences until it reaches the predetermined number of sequences. Then, whenever the register seeks to add a new higher weighted sequence, the register may remove the lowest weighted sequence (i.e., the sequence of those in the register with the lowest measure of efficacy with respect to the predetermined selection criteria). The register may then again employ the adjusting unit 320 to provide the sequences stored in the register to the accumulator (the accumulator having been cleared following its prior statistical treatment). And the tracking unit may effect a statistical treatment of the respective sequences, again employing the accumulator. The accumulator may then again be cleared of the respective sequences.

The selector 306 may provide the new sequence to the regulating unit 314 (regardless of whether it is deemed appropriate for storing and effecting statistical treatment by the tracking unit 308). In some examples, measure of efficacy of the new sequence may accompany the new sequence to the regulating unit so that the regulating unit may identify and store at least a most-aligned-sequence-yet-received. The regulating unit may employ at least one predetermined criterion to either: (1) instruct the generator 324 to generate another initial new sequence, or (2) present the most-aligned-sequence-yet-received to the output locus 316, thus terminating the optimization operation.

If the generator 324 is ordered to generate another initial new sequence, the system 300 may continue the optimization operation using the improver 326, evaluator 312, solution store 304, selector 306, tracking unit 304 and regulating unit 314 as described above, until occurrence of at least one predetermined criterion. In some examples, the predetermined criterion may be embodied in a predetermined number of new sequences being evaluated by the evaluator or may be one or more other criteria.

Figure 5:
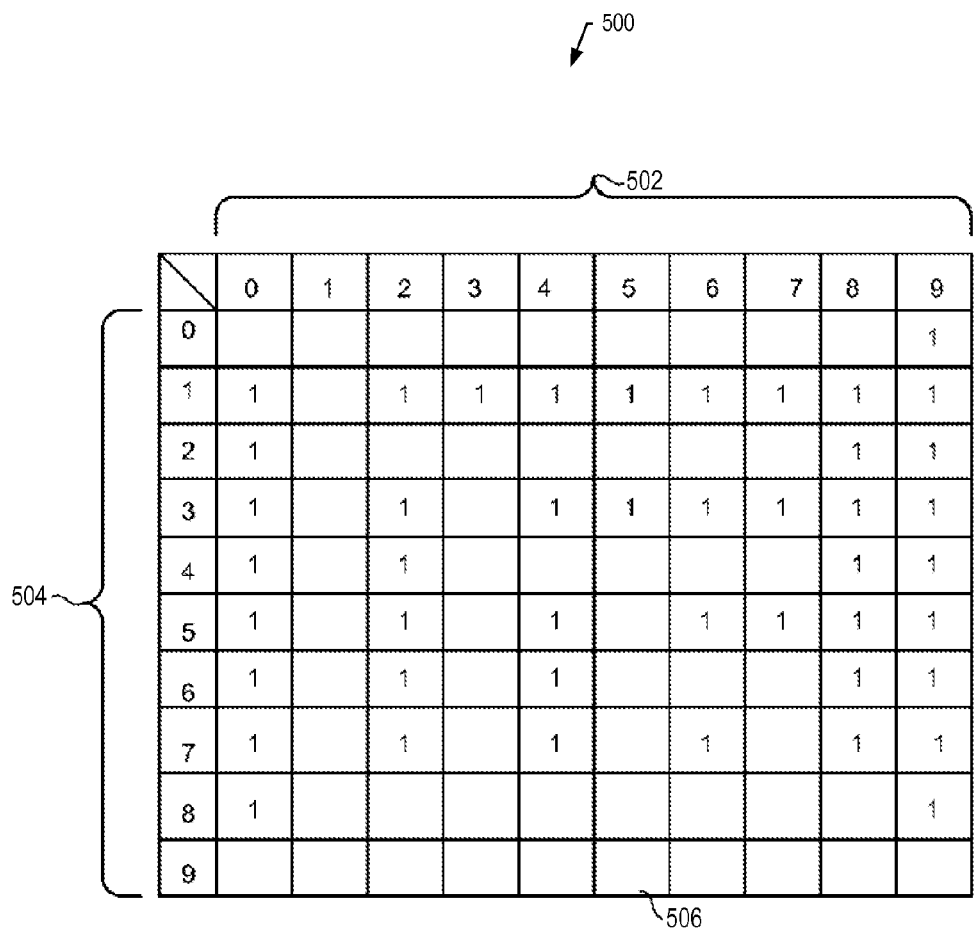

FIG. 5 is a schematic diagram of a representation of a first example sequence stored in the accumulator 322 according to the example implementations of the present disclosure. In FIG. 5, a grid or table 500 may be arranged with elements of a sequence (e.g., numerals 0, 1, 2, 3, 4, 5, 6, 7, 8, 9) arrayed in columns 502 and in rows 504. Individual cells may be identified by a (row, column) designation so that, for example, a cell 56 in row 9, column 5 may be identified as cell (9, 5) or cell [9][5]. The grid may represent a statistical record of all occurrences of one item (e.g., task) before another item in sequences which the accumulator 322 may currently treat. As each sequence is created (e.g., by generator 324) and processed for storing in the solution store 304, and selection and storing in the register 314 for treatment by the accumulator, the accumulator may present in the grid a count in each cell (a, b) of how many times an item [a] may appear preceding an item [b] among the currently-treated sequences.

By way of simplistic example and not by way of limitation, consider the grid 500 populated using the above routine given the following four sequences:

Sequence #1: 1, 3, 5, 7, 6, 4, 2, 8, 0, 9
Sequence #2: 0, 1, 7, 9, 8, 3, 4, 5, 6, 2
Sequence #3: 2, 1, 7, 8, 9, 6, 5, 4, 3, 0
Sequence #4: 8, 4, 5, 2, 6, 9, 0, 1, 7, 3

To illustrate, in Sequence #1 (1, 3, 5, 7, 6, 4, 2, 8, 0, 9):
Since "1" precedes 3, 5, 7, 6, 4, 2, 8, 0 and 9, "1" may be added to each of cell (1, 3), (1, 5), (1, 7), (1, 6), (1, 4), (1, 2), (1, 8), (1, 0) and (1, 9).

Since "3" precedes 5, 7, 6, 4, 2, 8, 0 and 9, "1" may be added to each of cell (3, 5), (3, 7), (3, 6), (3, 4), (3, 2), (3, 8), (3, 0) and (3, 9).

Since "5" precedes 7, 6, 4, 2, 8, 0 and 9, "1" may be added to each of cell (5, 7), (5, 6), (5, 4), (5, 2), (5, 8), (5, 0) and (5, 9).

Since "7" precedes 6, 4, 2, 8, 0 and 9, "1" may be added to each of cell (7, 6), (7, 4), (7, 2), (7, 8), (7, 0) and (7, 9).

Since "6" precedes 4, 2, 8, 0 and 9, "1" may be added to each of cell (6, 4), (6, 2), (6, 8), (6, 0) and (6, 9).

Since "4" precedes 2, 8, 0 and 9, "1" may be added to each of cell (4, 2), (4, 8), (4, 0) and (4, 9).

Since "2" precedes 8, 0 and 9, "1" may be added to each of cell (2, 8), (2, 0) and (2, 9).

Since "8" precedes 0 and 9, "1" may be added to each of cell (8, 0) and (8, 9).

Since "0" precedes 9, "1" may be entered in cell (0, 9).

And since "9" precedes nothing, no entry may be made in the row of grid 500 associated with "9."

FIG. 6 is a schematic diagram of a representation of a second example sequence stored according to the example implementations of the present disclosure, and more specifically a grid 600 that may be populated using the above routine given Sequence #2. FIG. 7 is a schematic diagram of a representation of a third example sequence stored according to the example implementations of the present disclosure, and more specifically a grid 700 that may be populated using the above routine given Sequence #3. And FIG. 8 is a schematic diagram of a representation of a fourth example sequence stored according to the example implementations, and more specifically a grid 800 that may be populated using the above routine given Sequence #4.

FIG. 9 is a schematic diagram of a representation of data stored in the accumulator of the present disclosure after adding representations illustrated in FIGS. 5 and 6. In FIG. 9, a cell-by-cell addition of cells in FIGS. 5 and 6 (i.e., Sequences #1 and #2) may yield the cell-by-cell sum-array or grid 900 illustrated in FIG. 9. Entries in cells of the grid may indicate a number of occurrences of a particular numeral appearing before another particular number in Sequences #1 and #2. Thus, by way of example, cell (6,2) contains a "2" entry, indicating that the number 6 may appear before the number 2 in both of Sequences #1 and #2. Cell (2,5) contains a "0" entry, indicating that the number 2 may not appear before the number 5 in both of Sequences #1 and #2. Cell (5,0) contains a "1" entry, indicating that the number 5 may appear before the number 0 in one of Sequences #1 and #2. The annotation scheme may be understood by one skilled in the art of statistical evaluations. In order to avoid prolixity, a detailed description of each respective cell (a, b) will not be provided here.

FIG. 10 is a schematic diagram of a representation of data stored in the accumulator of the present disclosure after adding representations illustrated in FIGS. 7 and 9, and in which a cell-by-cell addition of cells in FIGS. 5, 6 and 7 (i.e., Sequences #1, #2 and #3) may yield the illustrated cell-bycell sum-array or grid 1000. FIG. 11 is a schematic diagram of a representation of data stored in the accumulator of the present disclosure after adding representations illustrated in FIGS. 8 and 10, and in which a cell-by-cell addition of cells in FIGS. 5, 6, 7 and 8 (i.e., Sequences #1, #2, #3 and #4) may yield the illustrated cell-by-cell sum-array or grid 1100. Entries in cells of grid 1000 may indicate a number of occurrences of a particular numeral appearing before another particular number in Sequences #1, #2 and #3, and those in cells of grid 1100 may indicate a number of occurrences of a particular numeral appearing before another particular number in Sequences #1, #2, #3 and #4.

In the cell-by-cell sum-arrays or grids 1000, 1100 presented in FIGS. 10 and 11, numerals contained in respective cells (a, b) may indicate the number of occurrences of ordering relationships experienced among the sequences represented in the array. In FIG. 10, for example, cells (a, b) containing a "0" may show ordering relationships that did not occur in Sequences #1, #2 and #3. Cells (a, b) containing a "1" may show ordering relationships that occurred only one time in Sequences #1, #2 and #3. Cells (a, b) containing a "2" may show ordering relationships that occurred only two times in Sequences #1, #2 and #3. Cells (a, b) containing a "3" may show ordering relationships that occurred three times in Sequences #1, #2 and #3.

Also in FIGS. 10 and 11, the sum of "opposite" cells—that is, the sum of cell (a, b) and cell (b, a)—equals c, where c equals the number of sequences that have been employed to construct the cell-by-cell sum-array or grid 1000. 1100. In the case of FIG. 10, for example, c=3. This symmetry between opposite cells may permit desired results from statistically weighted sorts described in connection with FIGS. 13, 14 and 15.

FIG. 12 is a schematic diagram of a representation of data stored in the accumulator 322 as illustrated in FIG. 11, with row and column sums presented. In FIG. 12, sums of entries in each row and in each column of the cell-by-cell sum-array or grid 1100 presented in FIG. 11 are presented adjacent to respective rows and columns in a grid 1200. The row sums and column sums may be useful in carrying out statistical probability calculations described in connection with FIGS. 13, 14 and 15.

The accumulator 322 may employ the grid 1200 to effect statistical treatment of sequences. The generator 324 may cooperate with the accumulator using the respective grid to create an initial new sequence that is statistically similar to sequences treated by the accumulator. In some examples, the generator may perform a statistical analysis by beginning with a random sequence. The random sequence may then modified by a series of three operations that perform a column-based sort, a row-based sort, and a cell-based sort to produce a final generated sequence.

The accumulator 322 and generator 324 may cooperate to extract statistics from columns of the grid 1200 to create a new sequence that may roughly measure the number of successors for each item (e.g., task) in a solution sequence. The initial random sequence may then be sorted into reverse order, using the successor data from the column-extraction to weight a probability of exchanging two items. In this regard, the probability of exchanging two items [a] and [b] may be expressed as:

$$P[Exch[a] \& [b]] \sim \{\Sigma col[b]\}/\{\Sigma col[a]+\Sigma col[b]\} \quad (1)$$

That is, the probability of exchanging item [a] with item [b] may be proportional to the sum of elements in column [b] divided by a quantity which is the sum of elements in a column containing element [a] plus the sum of elements in a column containing element [b]. This operation may be referred to as a column-based sort.

FIG. 13 is a schematic diagram of a representation of column probabilities associated with data presented in FIG. 12. In FIG. 13, a column-based sort may be carried out as described below. FIG. 13 may be regarded as a column-column array or grid 1300. That is, "columns" in FIG. 13 and "rows" in FIG. 13 each represent columns in expression (1). Said another way, the column sum for column [a] may be read at the end of a horizontal "row" in FIG. 13, and the column sum for a column [b] may be read at the bottom of a vertical "column" in FIG. 13.

In some examples, to evaluate probability of exchanging a "3" with a "5" in the sequences represented in FIG. 12, one may employ expression (1) as follows:

$$P[Exch[a] \& [b]] \sim \{\Sigma col[b]\}/\{\Sigma col[a]+\Sigma col[b]\}$$

$$P[Exch[3] \& [5]] \sim \{\Sigma col[5]\}/\{\Sigma col[3]+\Sigma col[5]\}$$

$$P[Exch[3] \& [5]] \sim \{10\}/\{18+10\}$$

$$P[Exch[3] \& [5]] \sim \{10\}/\{28\}$$

$$P[Exch[3] \& [5]] \sim 0.4 \quad (1)$$

This result may be found in grid 1300 at the matrix location (3, 5).

The annotation scheme of FIG. 13 may be understood by one skilled in the art of statistical evaluations. In order to avoid prolixity, a detailed description of each respective column-based sort represented in FIG. 13 will not be provided here.

Using column [b] as the numerator and (column [a]+column [b]) as the denominator in expression (1) may have the effect of sorting items (e.g., tasks) in the random sequence into approximately the same order as the columns if sorted into descending order by their respective column sums.

Statistics may be extracted from rows of grid 1300 that may roughly measure the number of predecessors for each item in a solution sequence. The sorted sequence of the column-based sort may be sorted into order, using the predecessor data from the column-extraction above to weigh probability of exchanging two items. The probability of exchanging two items [a] and [b] may be expressed as:

$$P[Exch[a] \& [b]] \sim \{\Sigma row[a]\}/\{\Sigma row[a]+\Sigma row[b]\} \quad (2)$$

That is, the probability of exchanging item [a] with item [b] may be proportional to the sum of elements in row [a] divided by a quantity which is the sum of elements in a row containing element [a] plus the sum of elements in a row containing element [b]. This operation may be referred to as a row-based sort.

FIG. 14 is a schematic diagram of a representation of row probabilities associated with data presented in FIG. 12. In FIG. 14, a row-based sort may be carried out as described below. FIG. 14 may be regarded as a row-row array or grid 1400. That is, "columns" in FIG. 14 and "rows" in FIG. 14 each represent rows in expression (2). Said another way, the row sum for row [a] may be read at the end of a horizontal "row" in FIG. 14, and the row sum for a row [b] may be read at the bottom of a vertical "column" in FIG. 14.

In some examples, to evaluate probability of exchanging a "3" with a "5" in the sequences represented in FIG. 13, one may employ expression (2) as follows:

$$P[Exch[a] \& [b]] \sim \{\Sigma row[a]\}/\{\Sigma row[a]+\Sigma row[b]\}$$

$$P[Exch[3] \& [5]] \sim \{\Sigma row[3]\}/\{\Sigma row[3]+\Sigma row[5]\}$$

P[Exch[3] & [5])~{9}/{9+17}

P[Exch[3] & [5])~{9}/{26}

P[Exch[3] & [5])~0.4     (2)

This result may be found in grid 1400 at the matrix location (3, 5).

The annotation scheme of FIG. 14 may be understood by one skilled in the art of statistical evaluations. In order to avoid prolixity, a detailed description of each respective column-based sort represented in FIG. 14 will not be provided here.

Using row [a] as the numerator and (row [a]+row [b]) as the denominator in expression (2) may have the effect of sorting items (e.g., tasks) in the random sequence into approximately the same order as the rows if sorted into ascending order by their respective row sums.

The row-based sort may be refined using contents of individual cells of grid 1400 to weight a probability of exchanging two items. The probability of exchanging two items [a] and [b] may be expressed as:

P[Exch[a] & [b])~{Σcell[a][b]}/{Σcell[a][b]+Σcell[b][a]}     (3)

That is, the probability of exchanging item [a] with item [b] may be proportional to the element in cell [a][b] divided by a quantity which is the sum of elements in cell [a][b] (i.e., a cell located by a row containing element [a] and a column containing element [b]) plus the sum of elements in cell [b][a] (i.e., a cell located by a row containing element [b] and a column containing element [a]). This operation may be referred to as a cell-based sort, and its result may be presented by the generator 324 as a new sequence.

FIG. 15 is a schematic diagram of a representation of cell probabilities associated with data presented in FIG. 12. In FIG. 15, a cell-based sort may be carried out as described below. In some examples, to evaluate probability of exchanging a "3" with a "5" in the sequences represented in FIG. 12, one may employ expression (3) as follows:

P[Exch[a] & [b])~{Σcell[a][b]}/{Σcell[a][b]+Σcell[b][a]}

P[Exch[3] & [5])~{Σcell[3][5]}/{Σcell[3][5]+Σcell[5][3]}

P[Exch[3] & [5])~{1}/{1+2}

P[Exch[3] & [5])~{1}/{3}

P[Exch[3] & [5])~0.3     (3)

This result may be found in a grid 1500 illustrated in FIG. 15 at the matrix location (3, 5).

The annotation scheme of FIG. 15 may be understood by one skilled in the art of statistical evaluations. In order to avoid prolixity, a detailed description of each respective column-based sort represented in FIG. 15 will not be provided here.

Using cell[a][b] as the numerator and (cell[a][b]+cell[b][a]) as the denominator in expression (3) may have the effect of sorting items (e.g., tasks) in the random sequence into approximately an order in which the probability of an item [a] occurring before an item [b] may be determined by the statistical data contained within the accumulator 322.

The result of this cell-based sort may be an output from the generator 324. The combination of operations described above may be important. Simple, deterministic sorts may not yield the careful balance between similarity and difference. In practice, a single sort (e.g., sorting by successors, by predecessors or by comparative weighting) may not fully reflect statistical characteristics of sequences represented in the accumulator 322.

For more information regarding aspects of the sequencing system 300 of example implementations, see U.S. Pat. No. 8,417,652, entitled: System and Method for Effecting Optimization of a Sequential Arrangement of Items, issued on Apr. 9, 2013, the content of which is incorporated by reference in its entirety.

Turning back, FIG. 4 illustrates a benchmarking system 400, which in some example implementations of the present disclosure may correspond to the benchmarking system 106 of FIG. 1. As indicated above and explained in greater detail below, the benchmarking system may be configured to benchmark one or more progressive combinatorial solvers each of which may include sub-parts that are iteratively operated as part of the search for a solution having a desirable quality, as measured by an appropriate metric value of the respective solution. The benchmarking system may enable reliable, effective configuration of progressive combinatorial solvers by adjusting the number of iterations for which the sub-parts are operated to yield a desirable balance between cost (e.g., execution time as determined by the number of sub-part iterations) and solution metric value.

The progressive combinatorial solvers may include a baseline progressive combinatorial solver, one or more subject progressive combinatorial solvers and the like. As explained above, examples of suitable subject progressive combinatorial solvers may include scheduling systems such as scheduling system 102, 200, sequencing systems such as sequencing system 104, 300) and the like.

One example of a suitable baseline progressive combinatorial solver is an unbiased combinatorial solver. In this regard, certain combinatorial problems of sufficient complexity have problem solution spaces in which typical solution metric values are approximately Gaussian distributed. Solutions found by these combinatorial solvers may be arranged in a histogram from which an empirical probability density function may be approximated, and this empirical probability density function may have a Gaussian-like, generally symmetric, two-tailed shape. The empirical cumulative probability density function may be visually correlated to a Gaussian cumulative probability density function, such as by superimposition of the functions or analytical testing by mathematical analyses such as the Anderson-Darling Test.

But it may not be necessary to calculate all potential solutions to a complex combinatorial problem in order to determine whether a measurement in the problem solution space is normally distributed. Rather, it may be is possible to evaluate solutions randomly distributed within the problem solution space, obtained via an unbiased combinatorial solver, and to subsequently assume that the unbiased solver solution space and the problem solution space are statistically equivalent. In this regard, an "unbiased" combinatorial solver may be any combinatorial solver that will construct a solution without imposing a fixed process that constrains the generated solutions and without applying any heuristic or other technique intended to construct a good solution.

Those practiced in the art of optimization may recognize that the following are examples of unbiased solvers:
 (1) in a TSP-type problem, a solver that 'visits' the problem cities in exactly the order of the input data; and
 (2) in an RCPS-type problem, a solver that attempts to schedule the problem activities in exactly the order of the input data, without violating precedence constraints (repeatedly processing the data in the same order until all activities have been scheduled).

In both cases, a population of solutions may be produced by randomly varying the order of the input data for the solver, and the problem solution space may be effectively sampled by repeating the process for the number of trials necessary to provide a desired statistical power. A similar sampling may used to evaluate solutions randomly distributed within a solver solution space, obtained via a subject combinatorial solver.

As explained in greater detail below, the benchmarking system 400 may be configured to benchmark of one or more combinatorial solvers to which a problem scenario may be applied, in accordance with the following pseudocode:

[1] For each combinatorial solver {
[2] initialize a parametric data collector
[3] for i=1 to number of parametric trials {
[4] let $j_i$=number of sub-part iterations for parametric trial i
[5] initialize a statistical data collector
[6] for k=1 to number of randomized executions {
[7] execute the combinatorial solver with $j_i$ sub-part iterations to find a most-desirable solution
[8] add a metric value of the most-desirable solution the statistical data collector
[9] }
[10] determine statistical parameters of data in statistical data collector
[11] add $j_i$, a cost of obtaining the solution metric value, and statistical parameters of trial i to the parametric data collector
[12] }
[13] determine a best-fit (parametric) function or model for data in the parametric data collector
[14] utilize the best-fit function to estimate solution metric values and numbers of sub-part iterations
[15] }
[16] utilize best-fit functions of combinatorial solvers to compare respective solvers As shown in FIG. 4, the benchmarking system 400 may include a benchmark control 402, combinatorial solver module 404 and progressive extension module 406. The combinatorial solver module may include a solver control 408, one or more progressive combinatorial solvers 410, statistical data collector 412, statistical model generator 414 and statistical model evaluator 416. The progressive extension module may include a parametric data collector 418, parametric model generator 420 and parametric model evaluator 422. And the progressive extension module may include a comparative model generator 424 and comparative model evaluator 426.

The benchmark control 402 may be generally configured to control operation of the combinatorial solver module 404 and progressive extension module 406. In some examples, the benchmark control may receive an indication of one or more parameters that may 'benchmark' or approximately describe the problem-solution space (for the baseline progressive combinatorial solver) or solver-solution space (for a subject progressive combinatorial solver). These parameters may include parameters of a statistical distribution, such as the mean ($\mu$) and standard deviation ($\sigma$) of a Gaussian or normal distribution or other distribution (e.g., Binomial, Poisson, Gumbel) that may be approximated by a Gaussian or normal distribution. Other examples of suitable parameters are the variance ($\sigma^2$) or other parameters of such a distribution. The benchmarking system 400 may then perform a benchmarking process according to these parameters.

The benchmark control 402 may provide one or more execution parameters to the combinatorial solver module or more particularly its solver control 408 to control its operation. In the combinatorial solver module, the solver control may be generally configured to control operation of the progressive combinatorial solver(s) 410 and statistical data collector 412. Examples of suitable parameters here may include for each of a plurality of parametric trials (for i=1 to a number of parametric trials), a respective number of sub-part iterations of the progressive combinatorial solver ($j_i$=the number of sub-part iterations for parametric trial i), and a number of randomized executions of the progressive combinatorial solver (for k=1 to a number of randomized executions).

At the beginning of the benchmarking process, the benchmark control 402 may initialize the progressive extension module, or more particularly its parametric data collector 418. Also at the beginning of the benchmarking process, a problem scenario may be applied to a progressive combinatorial solver 410, and which may include predetermined trial scenario data. For a RCPS problem scenario, for example, the predetermined trial scenario data may include task data for a plurality of tasks that collectively complete a project, and resource data for resources that perform the tasks, such as that described above.

The benchmark control 402 may direct performance of the parametric trials (for i=1 to a number of parametric trials) each of which with its respective number of sub-part iterations ($j_i$) of the progressive combinatorial solver 410.

For each parametric trial (i), the solver control 408 may initialize the statistical data collector 412, and direct the progressive combinatorial solver 410 to perform the number of randomized executions (for k=1 to a number of randomized executions) with the respective number of sub-part iterations ($j_i$). In this regard, the predetermined trial scenario data may be reordered into a randomized input form according to a random (random or pseudorandom) sequence, such as by use of a bubble-sort or other suitable routine. This randomized input form may then be input to the progressive combinatorial solver, which may solve the randomized input form to produce a solution.

For each randomized execution, the progressive combinatorial solver 410 may produce a solution to the problem scenario. Likewise, the progressive combinatorial solver may evaluate the solution to calculate or otherwise measure a metric value of the solution. As explained above, this metric value (e.g., cycle time) may indicate a quality of the solution. The progressive combinatorial solver may provide the solution and its metric value to the statistical data collector 412 for storage therein, such as in a table or array. The process or reordering the predetermined trial scenario into a randomized input form, and execution of the progressive combinatorial solver to solve the randomized input form, may then repeat for each of the number of random executions.

And after the plurality of randomized executions, the statistical model generator 414 may determine one or more statistical parameters of data in the statistical data collector 412. For example, the statistical model generator may be configured to analyze the statistical distribution of the solution metric values in the statistical data collector, and determine the statistical parameters for a statistical distribution function or model. As suggested above, for Gaussian distributions, such parameters may include the mean ($\mu$), variance ($\sigma^2$), standard deviation ($\sigma$) and the like, although other distribution functions and distribution function parameters are possible.

Notably, the statistical distribution functions of different progressive combinatorial solvers 410 operating on the same predetermined trial scenario data need not be the same. If the solution data may be reasonably approximated by a distribution (e.g., Gaussian, Binomial, Poisson, Gumbel) having defined moments and a defined cumulative density function, then the defined moments may be derived from the reported parameters and used, in conjunction with a reported statistical distribution function, as a basis for comparison. More sophisticated analyses of the reported parameters, such as comparisons of synthetic cumulative distribution functions plotted with respect to selected criterion of solution quality may also be used to compare combinatorial solver solution spaces best described by different statistical distribution functions.

In some examples, the statistical model evaluator 416 may evaluate the population of solution metric values in the statistical data collector 412 to verify that it may be reasonably approximated by a particular statistical distribution function. For example, the population may be plotted as a histogram for comparison with a distribution function which may be superimposed upon the plot. In another example, the population may be subjected to a mathematical analysis, such as the Anderson-Darling test, to check whether there is evidence of a significant deviation from an assumed probability distribution function. In some examples, the analysis performed by the statistical model generator 414 may include an automatic classification to determine the appropriate statistical distribution function, and thus the nature of the statistical parameters to be determined.

Further for each parametric trial (i), the statistical model generator 414 may add an indication of the number of sub-part iterations ($j_i$), a cost of obtaining the solution metric values, and the statistical parameters of the trial (i) to the parametric model collector 418, such as in a table or array. As suggested above, the metric values of solutions may be related to the cost of finding or otherwise producing the solutions. In some examples, the cost (e.g., execution time) may be directly proportional to the number of sub-part iterations ($j_i$) of the progressive combinatorial solver 410, and may therefore be the cost for the respective trial (i). This cost may be known beforehand, or in some examples, may be calculated by the progressive combinatorial solver.

After performing the plurality of parametric trials for the progressive combinatorial solver 410, the parametric model generator 420 may determine a best-fit (parametric) function or model from data in the parametric data collector 418. The best-fit model may be determined in accordance with any of a number of different techniques, such as those that focus on the correlation between the mean ($\mu$) and/or standard deviation ($\sigma$) of the metric values of the solutions produced by the progressive combinatorial solver 410 over the number of randomized executions, and the cost of obtaining the solution metric values. Examples of suitable best-fit models include a polynomial function of cost (or its roots), a logarithmic or exponential function of cost (or its roots), or a statistical function of cost (or its roots) such as inverse Gaussian, Binomial, Poisson, Gumbel or the like.

The parametric model evaluator 422 may utilize this best-fit model to estimate one or more solution metric values and numbers of sub-part iterations. For example, the parametric model evaluator may use the model to determine the most likely solution metric value for a given cost, or determine the most likely cost for a given solution metric value. As another example, consider an instance in which the model correlates both the mean ($\mu$) and standard deviation ($\sigma$) of the solution metric value to its cost, the parametric model evaluator may use the model to determine the probability of a given solution metric value for a given cost.

The comparative model generator 424 may generate best-fit models from a plurality of progressive combinatorial solvers 410, and the comparative model evaluator 426 may utilize these best-fit models to compare their relative quality of solving the problem scenario. These progressive combinatorial solvers may include a subject progressive combinatorial solver and a second progressive combinatorial solver, which may be a baseline progressive combinatorial solver or another subject progressive combinatorial solver. In some examples, the best-fit models of a plurality of subject progressive combinatorial solvers may be used to make quantitative comparisons between the respective solvers. In some examples, the best-fit model of a subject progressive combinatorial solver and the best-fit model of a baseline progressive combinatorial solver may be compared to determine whether the subject progressive combinatorial solver is better than, worse than or otherwise comparable to the baseline progressive combinatorial solver. In this regard, comparative model evaluator may generate a graph or other visual representation of (generally "plot") the best fit models of subject and second (e.g., baseline, subject) progressive combinatorial solvers to enable a visual determination (e.g., by a user) of whether the subject progressive combinatorial solver is better than, worse than or otherwise comparable to the second progressive combinatorial solver.

In some examples, solution metric values of subject and second (e.g., baseline, subject) progressive combinatorial solvers at a given cost may be compared to determine whether the subject progressive combinatorial solver is better than, worse than or otherwise comparable to the second progressive combinatorial solver at the given cost. Additionally or alternatively, in some examples, slopes or derivatives of the best-fit models for the subject and second progressive combinatorial solvers may be compared to determine whether a rate of improvement of the subject progressive combinatorial solvers is better than, worse than or otherwise comparable to the rate of improvement of the second progressive combinatorial solver. Additionally or alternatively, in some examples, asymptotes of the best-fit models for the subject and second progressive combinatorial solvers may be compared to determine whether limiting behavior of the subject progressive combinatorial solver is better than, worse than or otherwise comparable to the limiting behavior of the second progressive combinatorial solver.

In some examples, again, the benchmarking results for each of one or more progressive combinatorial solvers 410 may include the mean ($\mu$) and standard deviation ($\sigma$) of the problem-solution space (for the baseline progressive combinatorial solver) or solver-solution space. The results may also include identification of the underlying distribution such as a Gaussian, Binomial, Poisson or Gumbel distribution. By knowing the mean, standard deviation and underlying distribution, it may be possible to estimate the probability of finding a solution with a target metric value less than or equal too some target value x using the cumulative distribution function of the underlying distribution: $p(x)=cdf(x)$.

Assume for the sake of illustration that executing a first progressive combinatorial solver 410 has a cost C. Also assume that the progressive combinatorial solver may be executed multiple independent times, each time randomizing the predetermined trial scenario data. In this case, the number of independent iterations required to find a solution with target metric value less than or equal too some target value x may be estimated using the cumulative distribution function of the underlying distribution: $i(x)=1/cdf(x)$. And the cost of finding a solution with target metric value less than or equal too some target value x may be estimated: $cost(x)=C \times (1/cdf(x))$.

Figure 16:
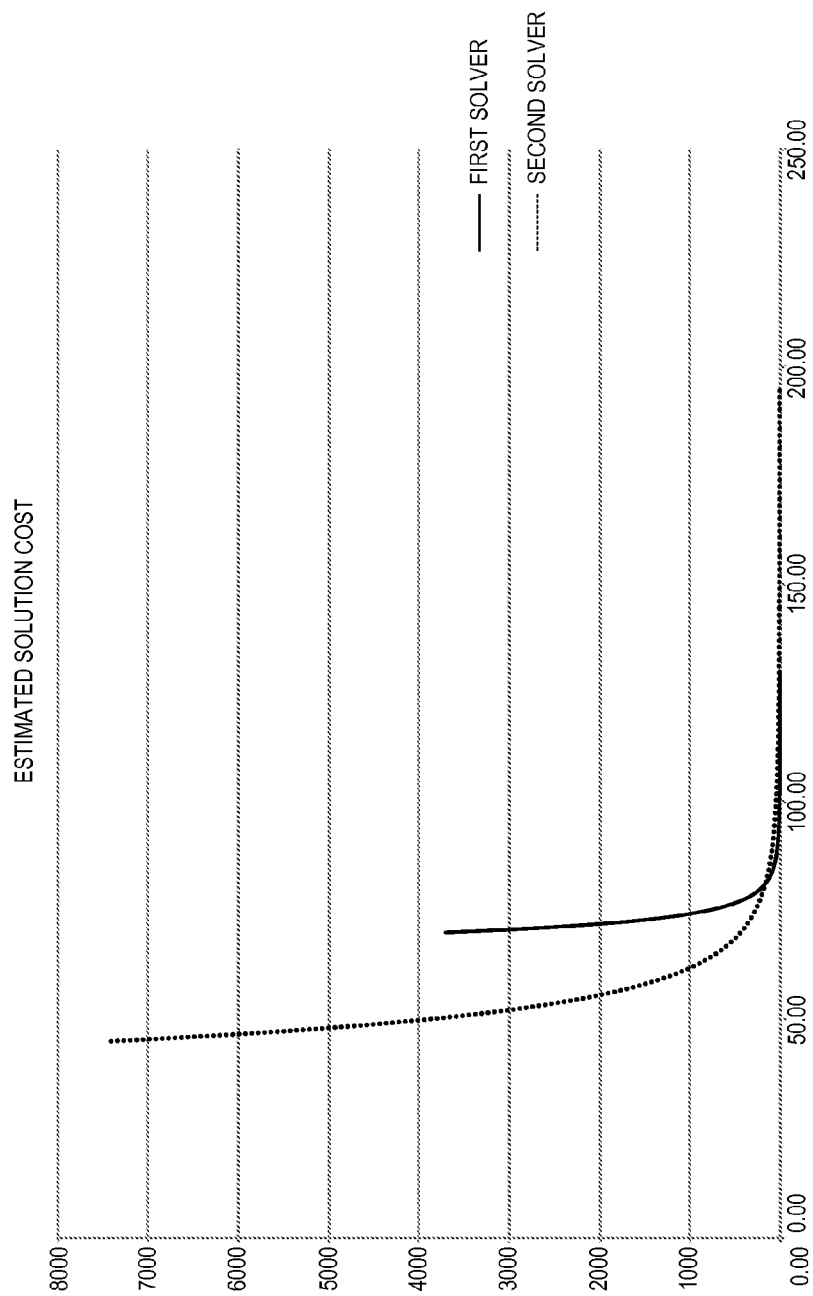
FIGS. 16 and 17 illustrate cost functions for first and second progressive combinatorial solvers, according to example implementations of the present disclosure.
Figure 17:
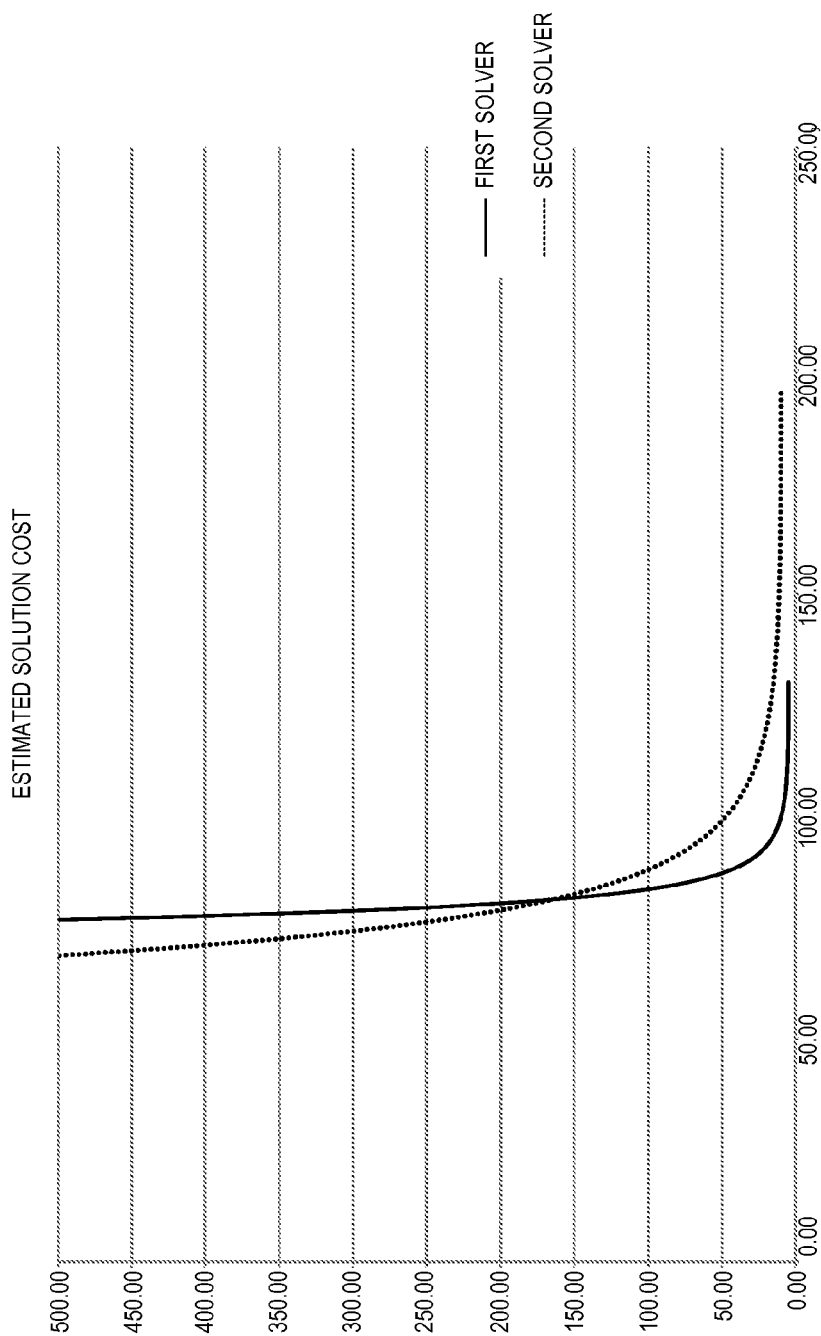

FIGS. 16 and 17 illustrate the cost functions—cost(x)—for first and second progressive combinatorial solvers 410, both figures for the same data, but with different vertical scale. Each of the cost functions has a different mean ($\mu$), standard deviation ($\sigma$) and cost per solution. As shown, FIG. 16 illustrates that the first progressive combinatorial solver may find a solution with metric value 70, with an estimated cost of 3700; while the second progressive combinatorial solver may find a solution with a better metric value 50, with a similar cost of 3700. FIG. 17 illustrates that the first and second progressive combinatorial solvers may find a solution with metric value 80, with similar cost of 165. It also illustrates that the first progressive combinatorial solver may be more effective (has lower cost) for solutions with metric value less than 80, while the second progressive combinatorial solver may be more effective (has lower cost) for solutions with metric value greater than 80.

Example 1

Sort-Shift Scheduling System

To further illustrate the benchmarking process of example implementations of the present disclosure, consider a progressive combinatorial solver such as the scheduling system 102, 200 described above. And more particularly, consider the four example variations, namely, the first variation, second variation, third variation and fourth variation, according to which the scheduling system 200 may be configured to schedule tasks of a project. In each of these variations, the cost of obtaining a schedule may be set on a per-schedule basis (one for each shift-sort). Thus, the first variation may have a cost of two schedules, the second variation may have a cost of four schedules, the third and fourth variations may each have a cost of six schedules.

FIGS. 18-21 illustrate graphs of empirical data and models that may be generated by the benchmarking system 400 for comparing these variations of the scheduling system 200, and which data may demonstrate a correlation of mean solution metric value to $1/\sqrt{(cost)}$. Graphs and models such as those illustrated in FIGS. 18-21 may provide simple and effective tools for comparing the performance of the first through fourth variations over multiple iterations and provide a means to accurately estimate the cost and benefit of such variations when specific limits are place on the number of sub-part iterations.

Figure 18:
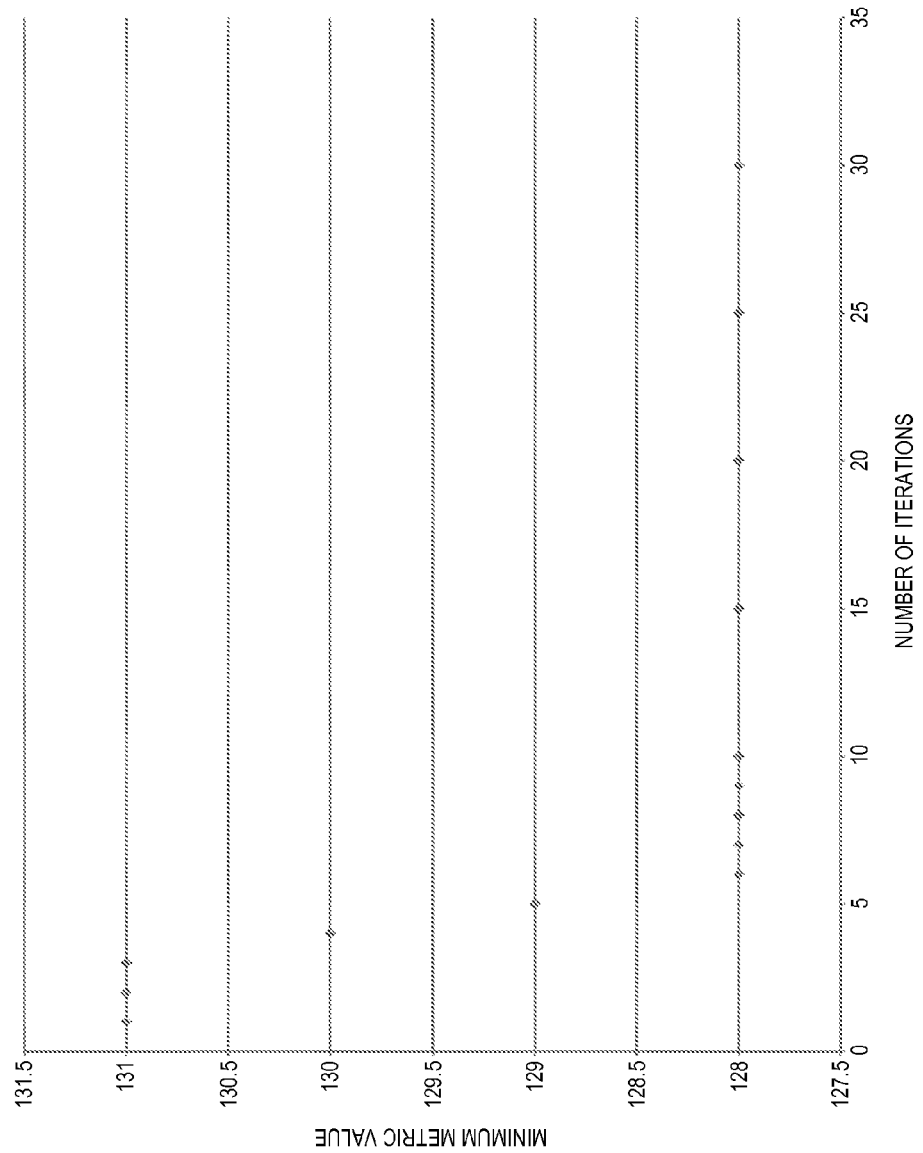
Figure 19:
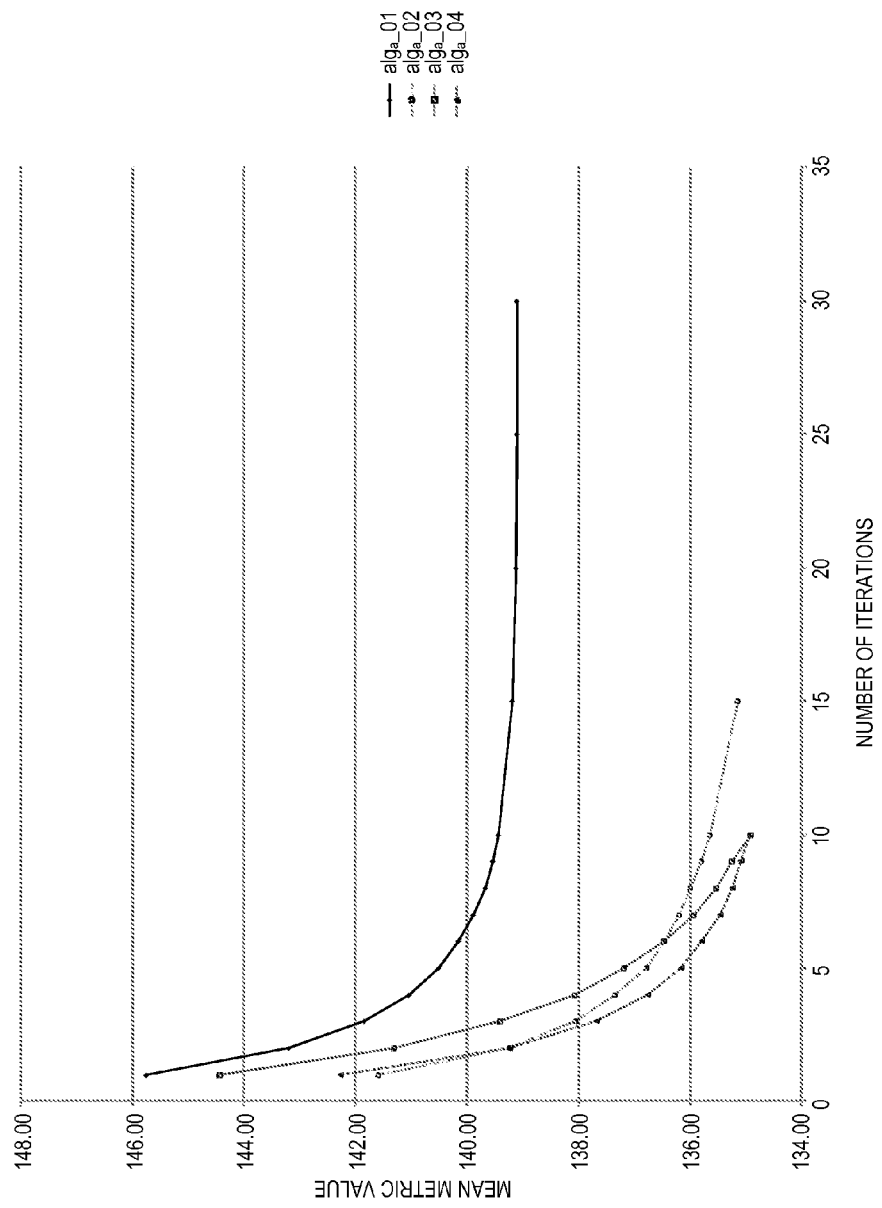
Figure 20:
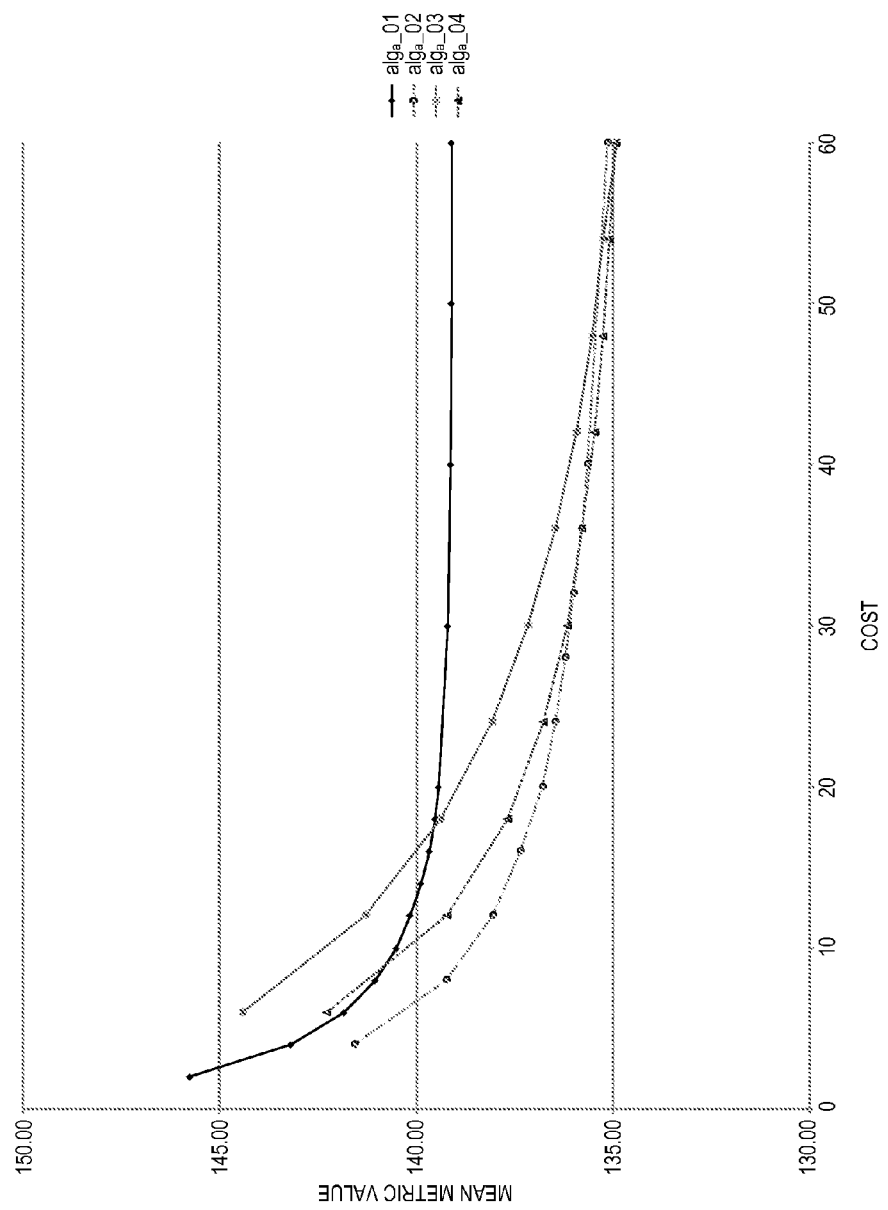
Figure 21:
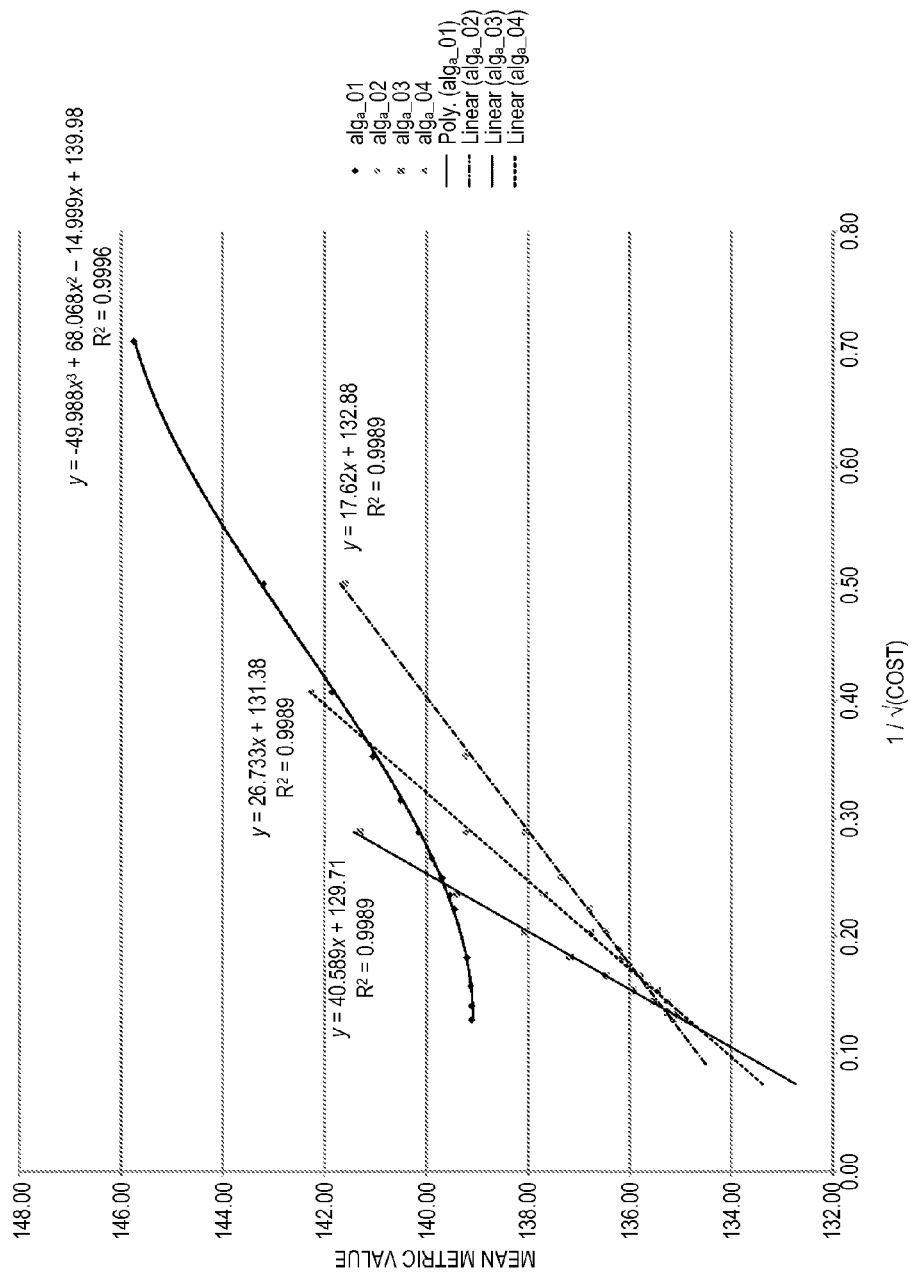

FIG. 18 illustrates a graph of numbers of iterations versus minimum solution metric value for the first variation. FIG. 19 illustrates numbers of iterations versus mean solution metric value for the first variation ("$alg_a\_01$"), second variation ("$alg_a\_02$"), third variation ("$alg_a\_03$") and fourth variation ("$alg_a\_04$"), and FIG. 20 illustrates cost versus mean solution metric value for the variations. And FIG. 21 illustrates $1/\sqrt{(cost)}$ versus mean solution metric value for the variations. In this regard, FIG. 21 illustrates the best-fit model for each variation, along with correlation coefficient, where the best-fit model is shown as a simple function of x, where $x=1/\sqrt{(cost)}$.

It may be seen from FIGS. 18-21 that best-fit models based upon some measure of cost and the statistical mean (FIG. 21) may be superior to models of the scheduling system's behavior based upon recorded minimums (FIG. 18). It may be seen in FIG. 20 that the rate of improvement of the first variation of the scheduling system 200 declines to the point that there is no visible improvement after cost 30. It may also be seen that the third variation may be the worse at cost 6, but by cost 60 may be comparable to the second and fourth variations. Moreover, it may be seen that the second through fourth variations may have superior performance and scalability over the first variation.

Example 2

Genetic Algorithms

Now, as another example to further illustrate the benchmarking process of example implementations of the present disclosure, consider a progressive combinatorial solver such as the sequencing system 104, 300 described above. The sequencing system of example implementations may provide capabilities similar to genetic combinatorial solvers for RCPS problems. These combinatorial solvers often make use of two operators, categorized as "mutator" (making small random changes to one solution) and "combinator" (combining parts of two solutions). This example may compare five such combinatorial solvers. The first two may be characterized as mutator combinatorial solvers, the third may be characterized as a combinator combinatorial solver, and the last may be characterized as a combination of mutator and combinator combinatorial solver. All of these operate upon a pool of the best schedule sequences found so far in the scheduling process.

More particularly, the first combinatorial solver ("$alg_b\_00$") may on each iteration generate an entirely random solution and report on the best solution found so far. The second combinatorial solver ("$alg_b\_01$") may switch the position of two items (e.g., tasks) anywhere in a randomly chosen schedule sequence. The third combinatorial solver ("$alg_b\_02$") may switch the position of two items in a randomly chosen schedule sequence, with a bias towards choosing items that are near each other in the sequence (e.g., schedule sequence). The fourth combinatorial solver ("$alg_b\_03$") may add two randomly chosen schedule sequences into a combinator with equal weight and generate using a topological sort, as described above with respect to the sequencing system 104, 300. And the fifth combinatorial solver ("$alg_b\_04$") may apply a combination of the fourth combinatorial solver with biased weights, the fourth combinatorial solver with random weights, and the third combinatorial solver.

Figure 22:
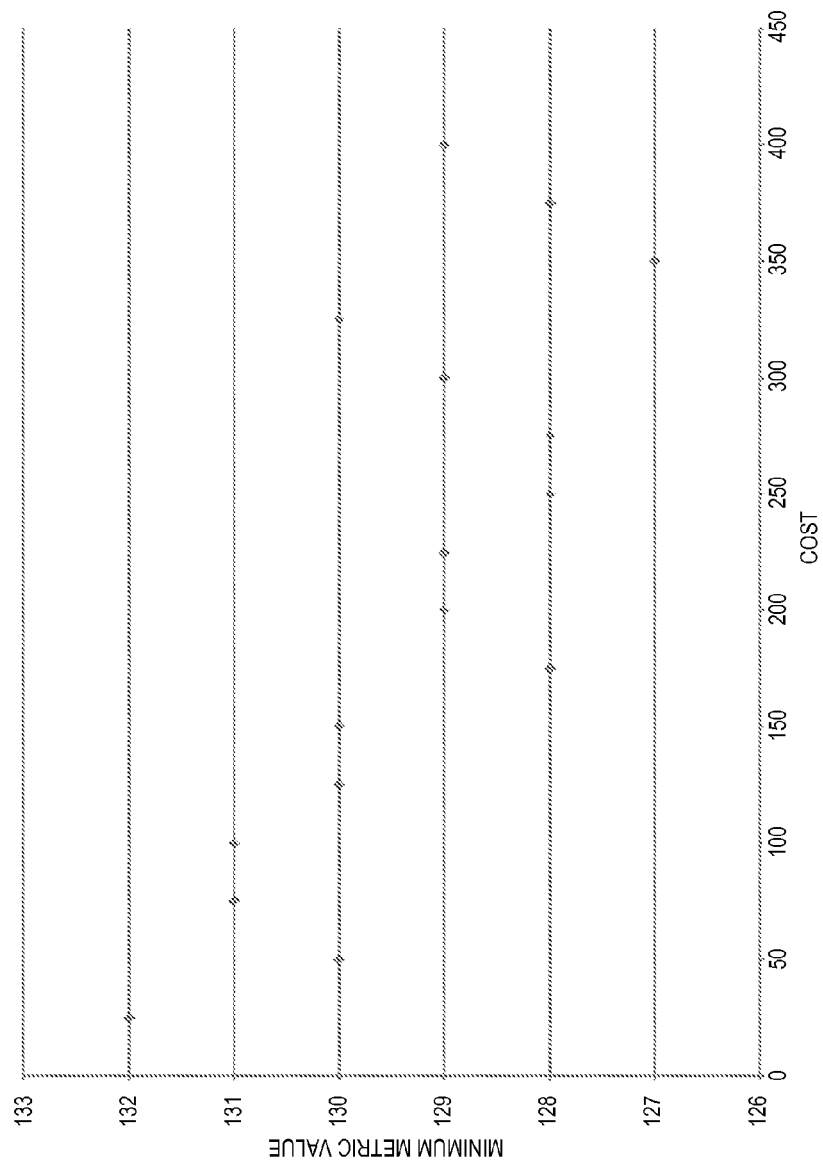
Figure 23:
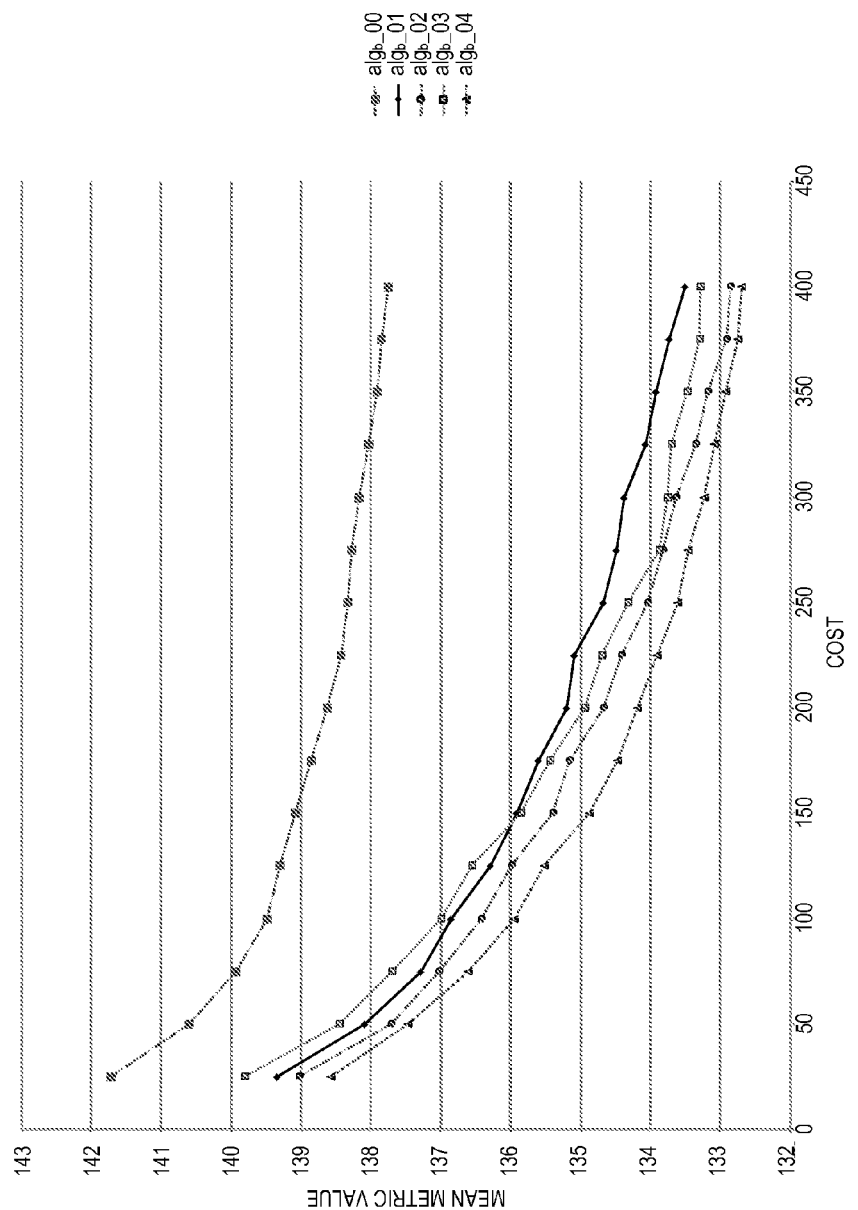
Figure 24:
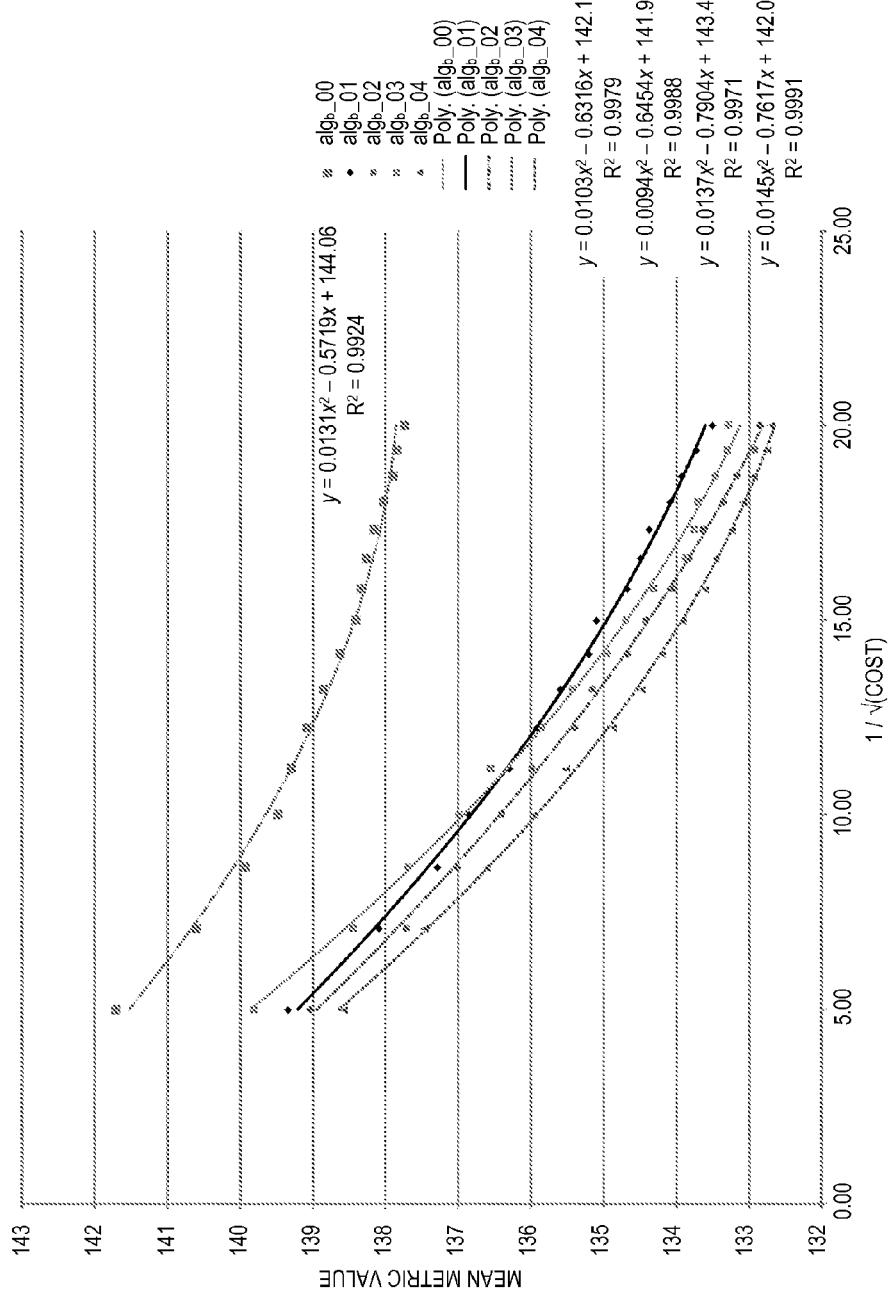

FIGS. 22-25 illustrate graphs of empirical data and models that may be generated by the benchmarking system 400 for comparing these five combinatorial solvers. FIG. 22 illustrates a graph of cost versus minimum solution metric value for the second combinatorial solver. FIG. 23 illustrates a graph of cost versus mean solution metric value for the first through fifth combinatorial solvers. FIG. 24 illustrates a graph of $1/\sqrt{(cost)}$ versus mean solution metric value for the first through fifth combinatorial solvers. Similar to the prior example, graphs and models such as those illustrated in FIGS. 22-25 may provide simple and effective tools for comparing the performance of the combinatorial solvers over multiple iterations.

Also similar to the prior example, FIG. 24 illustrates the best-fit model for each combinatorial solver, along with correlation coefficient, where the best-fit model is shown as a simple function of x, where $x=1/\sqrt{(cost)}$. But there is another correlation between cost and mean that may be considered. When benchmarking progressive combinatorial solvers, it may be important to consider how a given solver compares to generating random solutions, and each iteration reporting the best solution found so far ($alg_b\_00$). To make this comparison, in FIG. 25, each of these combinatorial solvers is graphed in comparison to $x=norminv(1/cost, \mu, \alpha)$, where the function "norminv" returns the inverse of the normal cumulative distribution for the mean (μ) and standard deviation (σ), and (1/cost) refers to a probability corresponding to the normal distribution.

Figure 25:
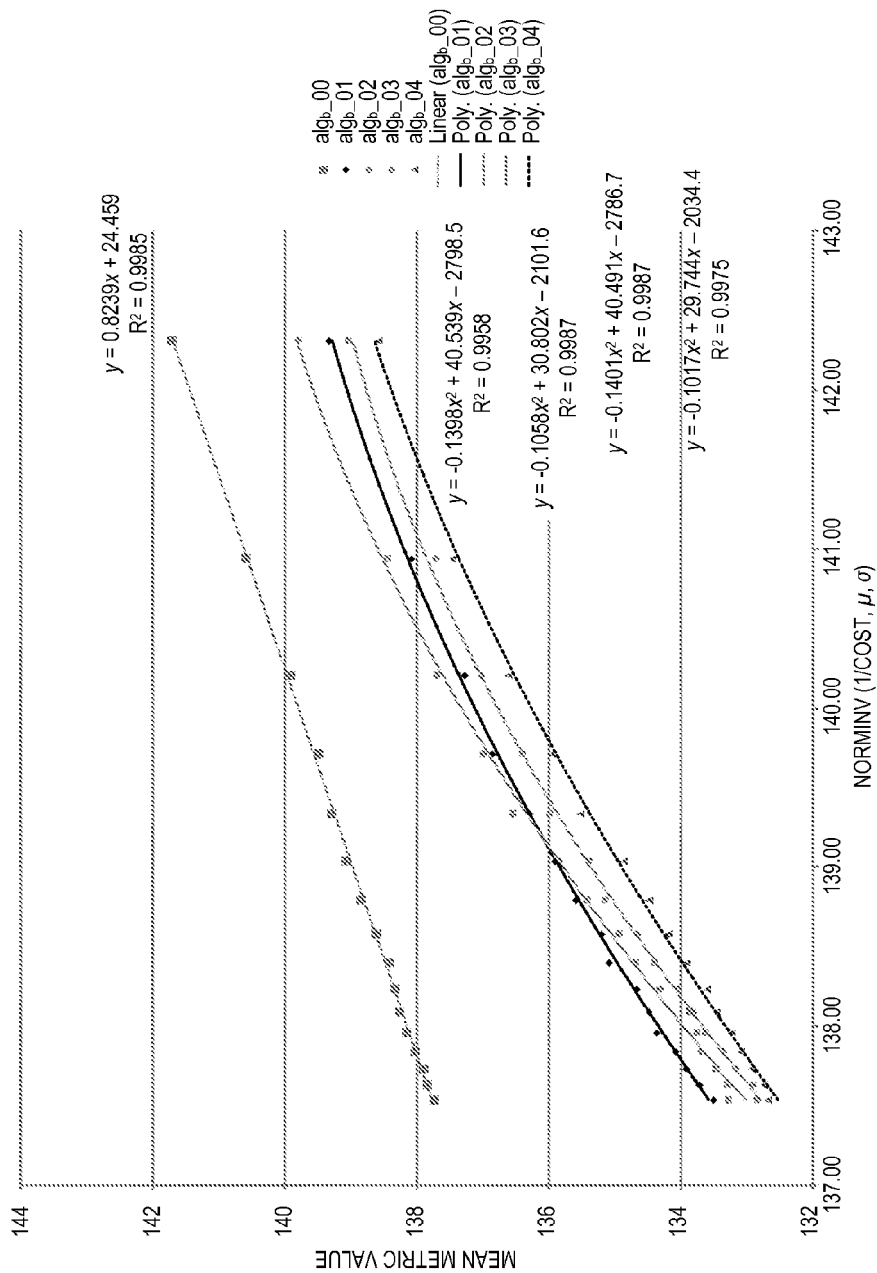

In FIG. 25, the first combinatorial solver ($alg_b\_00$) appears as a straight line (constant derivative), while all of the others are lower than first combinatorial solver and curve downward (from right to left) (decreasing derivative from left to right). This may demonstrate that these combinatorial solvers are better than random search, and among them the fifth combinatorial solver ($alg_b\_04$) may be the best. But from an inspection of these graphs, it may appear that the performance of the third combinatorial solver ($alg_b\_02$) (a far simpler algorithm) may exceed that of fifth combinatorial solver with the expenditure of greater effort (iterations and cost). As shown, though, best-fit models based upon some measure of cost and the statistical mean may be considered superior to attempts to models of solver behavior based upon recorded minimums.

When large scale data sets are used to conduct benchmark trials, recording that minimum total solution metric value, the time required to conduct such trials is often prohibitive. Worse, the outcome of a given trial is often determined more by the effect of random variation in the solutions than performance of the combinatorial solvers being considered (and it may be impossible to identify how much random variation affects the results without running many additional independent trials).

Use of the benchmarking system 400 of example implementations to determine the statistical properties of a problem and the solutions generated by a given combinatorial solver 410 may avoid confusion created by random variation by instead characterizing the effect of random variation by the mean (μ) and standard deviation (σ). The benchmarking system may collect a sequence of parametric data points that may be used to derive a best-fit model of solver performance; and the quality of the analysis may be greater, and with a reduction in the time required to do the analysis may be significantly relative to repeatedly running a full data set of benchmark problems.

Returning now to FIG. 1, the combinatorial-optimization system 100 and its subsystems including the scheduling system 102, sequencing system 104 and benchmarking system 106 may be implemented in various combinations and interact with one another in various manners. A number of examples of this are described above. Other examples are described below.

Many scheduling systems schedule tasks by making a series of individual scheduling decisions, often considering the subject tasks one by one in order of precedence. When scheduling in a forward direction, this means that the task with no predecessor tasks may be the first task scheduled, and each task thereafter may be scheduled at the earliest possible time (consistent with applicable constraints such as precedence constraints, resource requirements and then like), and only after all of its predecessors are scheduled. Likewise, when scheduling in a backward direction, the task with no successor tasks may be the first task scheduled, and each task thereafter may be scheduled at the latest possible time (consistent with applicable constraints), and only after all of its successors are scheduled.

The specific details of the resulting schedule, such as the start time, completion time and resource assignment for each task, and the cycle time of the schedule, may be determined by the order (sequence) in which tasks are considered for scheduling. If two schedules are created wherein the tasks are considered for scheduling according to two different sequences (while respecting applicable constraints), the specific details of the resulting schedules may be different. One schedule may have a shorter cycle time than the other. But other than by the techniques described above according to example implementations of the present disclosure, there may not be a way to determine in advance a resulting schedule and its cycle time.

In some examples, the scheduling system 102 may be coupled to the sequencing system 104 in a manner that produces an even further improved system for schedule optimization. The scheduling system and sequencing system may be coupled to one another in various manners, such as to perform the following operations to schedule tasks in the forward direction (from a given start time) that may be repeated. The operations are described with reference to scheduling in the forward direction from a given commencement time boundary, although it should be understood that the logic may be equally applicable to scheduling in the backward direction from a given completion time boundary.

1. Each time the scheduling system 102 schedules tasks in the forward direction, the scheduling system may sort the tasks in the resulting schedule by scheduled start time and make note of their sequence in that list. The scheduling system may then communicate the resulting sequence along with the metric value of the schedule to the sequencing system 104 as input.

2. Each time the sequencing system 104 generates a sequence of tasks (e.g., by generator 324), the scheduling system 102 may be invoked to first sort the tasks according to that generated sequence, to schedule the tasks, and then make use of repeated application of sorting and shifting to thereby produce an improved schedule. Here, repeated application of the sorting and shifting may be a sub-part that may be subject to benchmarking by the benchmarking system 106 (see, e.g., FIGS. 18-21).

3. Finally, the scheduling system 102 may sort the tasks in the resulting improved schedule in chronological order by start time and make note of their sequence in that list. The scheduling system may then communicate the resulting sequence along with the metric value of the schedule back to the sequencing system 104 as input, whereupon the operations may be repeated.

The preceding combination of operations may be considered to define a progressive algorithm where their repeated application may be a sub-part subject to the benchmarking system 106 (see, e.g., FIGS. 22-25). And in some example implementations, the combinatorial-optimization system 100 and its scheduling system 102, sequencing system 104 and benchmarking system 106 may be configured to itself determine and adjust a desired number of iterations of the respective sub-parts.

Moreover, in some example implementations, the benchmarking system 104 may perform further analysis and feedback to improve a combinatorial solver such as the scheduling system 102. In this regard, many scheduling problems are asymmetric, meaning that if the activities are scheduled by two methods: one by scheduling the activities forward from some start time and the other by scheduling the activities backward from some start time, the two schedules may have different durations, and this may be considered an artifact of the scheduling problem scenario itself. In some examples, then, the benchmarking system may determine if the scheduling problem scenario is asymmetric. This may then be fed back to the scheduling system, which may then schedule the tasks of the scenario based on its asymmetry, either forward or backward, to obtain the shortest possible duration. For example, the benchmarking system may determine whether the problem is left biased or right biased, and feed this back to the scheduling system. If the problem is right biased, the scheduling system may invert the precedence relations before scheduling and performing subsequent sort-shift operations, following which the scheduling system may invert the resulting schedule to produce a final schedule.

According to example implementations of the present disclosure, the combinatorial-optimization system 100 and its subsystems including the scheduling system 102, sequencing system 104 and benchmarking system 106 may be implemented by various means. Similarly, the examples of a scheduling system 200, sequencing system 300 and benchmarking system 400, including each of their respective elements, may be implemented by various means according to example implementations. Means for implementing the systems, subsystems and their respective elements may include hardware, alone or under direction of one or more computer program code instructions, program instructions or executable computer-readable program code instructions (at times generally referred to as "computer programs," e.g., software, firmware, etc.) from a computer-readable storage medium.

In some examples, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for sequencing a plurality of items, the system comprising:
   a solution store configured to store a plurality of sequences of the items; and
   a processor programmed to implement a selector, register, accumulator and generator configured to perform a plurality of iterations of a process for generating a new sequence of the items, where for each iteration:
      the selector is configured to subject the plurality of sequences stored by the solution store to a weighted evaluation in which the plurality of sequences are weighted and compared according to respective measures of efficacy with respect to predetermined selection criteria, the selector being configured to select at least some of the plurality of sequences based on the weighted evaluation;
      the register is configured to store the selected at least some of the plurality of sequences;
      the accumulator is configured to effect a statistical treatment of the selected at least some of the plurality of sequences stored by the register, and
      the generator is configured to employ the statistical treatment to generate a new sequence,
   wherein for at least one of the iterations, the solution store is configured to further store the new sequence along with a respective measure of efficacy, and for at least one of the iterations, the selector is configured to select a higher-weighted one of the plurality of sequences stored by the solution store to displace a lowest-weighted one of the selected at least some of the plurality of sequences stored by the register.

2. The system of claim 1, wherein the predetermined selection criteria include one or more of a measure of statistical similarity or dissimilarity of between sequences of the plurality of sequences, an order in which the sequences are provided to the solution store, or a ranking of best sequences as measured according to an indication of quality.

3. The system of claim 1, wherein the generator being configured to generate the new sequence includes being configured to generate a new sequence that is statistically similar to the selected at least some of the plurality of sequences for which the accumulator is configured to effect the statistical treatment.

4. The system of claim 1, wherein the generator being configured to generate the new sequence includes being configured to generate an initial new sequence, and
   wherein the processor is further programmed to implement an improver configured to improve the initial new sequence to produce the new sequence.

5. The system of claim 4, wherein the plurality of items are a plurality of tasks collectively complete a project, tasks of the plurality of tasks having respective start times and completion times,
   wherein the improver includes a scheduling system configured to perform one or more iterations of a process for optimizing a tentative schedule of the plurality of tasks produced according to the initial new sequence,
   wherein for each iteration of the process for optimizing the tentative schedule, the scheduling system is configured to sort the plurality of tasks according to one or more keys to derive a temporary listing of scheduled tasks, and shift the scheduled tasks of the temporary listing towards either a commencement time boundary or a completion time boundary, commencing with one of the scheduled tasks and continuing in sorted order to a last of the scheduled tasks, without violating a constraint of the scheduled tasks, to generate a revised temporary listing of scheduled tasks to be implemented to complete the project, the revised temporary listing from a last of the one or more iterations corresponding to the new sequence produced by the improver.

6. The system of claim 5, wherein the scheduling system being configured to shift the scheduled tasks includes being configured to individually unschedule and then reschedule each task of the scheduled tasks to a new start time as close to the commencement time boundary as possible, or to a new completion time as close to the completion time boundary as possible.

7. The system of claim 5, wherein for at least one iteration, the scheduling system being configured to sort the plurality of tasks includes being configured to sort the plurality of tasks other than in chronological order by start time, or reverse chronological order by completion time.

8. A method for sequencing a plurality of items, the method comprising:
   storing a plurality of sequences of the items by a solution store; and
   performing a plurality of iterations of a process for generating a new sequence of the items, including for each iteration:
      subjecting the plurality of sequences stored by the solution store to a weighted evaluation in which the plurality of sequences are weighted and compared according to respective measures of efficacy with respect to predetermined selection criteria;

selecting at least some of the plurality of sequences based on the weighted evaluation;

storing the selected at least some of the plurality of sequences by a register, effecting a statistical treatment of the selected at least some of the plurality of sequences stored by the register; and employing the statistical treatment to generate a new sequence, wherein storing the plurality of sequences includes for at least one of the iterations, further storing the new sequence along with a respective measure of efficacy, and for at least one of the iterations, selecting at least some of the plurality of sequences further includes selecting a higher-weighted one of the plurality of sequences stored by the solution store to displace a lowest-weighted one of the selected at least some of the plurality of sequences stored by the register.

9. The method of claim 8, wherein the predetermined selection criteria include one or more of a measure of statistical similarity or dissimilarity of between sequences of the plurality of sequences, an order in which the sequences are provided to the solution store, or a ranking of best sequences as measured according to an indication of quality.

10. The method of claim 8, wherein generating the new sequence includes generating a new sequence that is statistically similar to the selected at least some of the plurality of sequences for which the accumulator is configured to effect the statistical treatment.

11. The method of claim 8, wherein generating the new sequence includes generating an initial new sequence, and
wherein the method further comprises improving the initial new sequence to produce the new sequence.

12. The method of claim 11, wherein the plurality of items are a plurality of tasks collectively complete a project, tasks of the plurality of tasks having respective start times and completion times,
wherein improving the initial new sequence includes performing one or more iterations of a process for optimizing a tentative schedule of the plurality of tasks produced according to the initial new sequence,
wherein the process for optimizing the tentative schedule includes for each iteration, sorting the plurality of tasks according to one or more keys to derive a temporary listing of scheduled tasks, and shifting the scheduled tasks of the temporary listing towards either a commencement time boundary or a completion time boundary, commencing with one of the scheduled tasks and continuing in sorted order to a last of the scheduled tasks, without violating a constraint of the scheduled tasks, to generate a revised temporary listing of scheduled tasks to be implemented to complete the project, the revised temporary listing from a last of the one or more iterations corresponding to the new sequence produced by the improver.

13. The method of claim 12, wherein shifting the scheduled tasks includes individually unscheduling and then rescheduling each task of the scheduled tasks to a new start time as close to the commencement time boundary as possible, or to a new completion time as close to the completion time boundary as possible.

14. The method of claim 12, wherein for at least one iteration, sorting the plurality of tasks includes sorting the plurality of tasks other than in chronological order by start time, or reverse chronological order by completion time.

15. A computer-readable storage medium for sequencing a plurality of items, the computer-readable storage medium being non-transitory and having computer-readable program code portions stored therein that, in response to execution by a processor, cause an apparatus to at least:
store a plurality of sequences of the items by a solution store; and
perform a plurality of iterations of a process for generating a new sequence of the items, including for each iteration the apparatus being caused to at least:
subject the plurality of sequences stored by the solution store to a weighted evaluation in which the plurality of sequences are weighted and compared according to respective measures of efficacy with respect to predetermined selection criteria;
select at least some of the plurality of sequences based on the weighted evaluation;
store the selected at least some of the plurality of sequences by a register,
effect a statistical treatment of the selected at least some of the plurality of sequences stored by the register; and
employ the statistical treatment to generate a new sequence,
wherein the apparatus being caused to store the plurality of sequences includes for at least one of the iterations, further being caused to store the new sequence along with a respective measure of efficacy, and for at least one of the iterations, the apparatus being caused to select at least some of the plurality of sequences further includes being caused to select a higher-weighted one of the plurality of sequences stored by the solution store to displace a lowest-weighted one of the selected at least some of the plurality of sequences stored by the register.

16. The computer-readable storage medium of claim 15, wherein the predetermined selection criteria include one or more of a measure of statistical similarity or dissimilarity of between sequences of the plurality of sequences, an order in which the sequences are provided to the solution store, or a ranking of best sequences as measured according to an indication of quality.

17. The computer-readable storage medium of claim 15, wherein the apparatus being caused to generate the new sequence includes being caused to generate a new sequence that is statistically similar to the selected at least some of the plurality of sequences for which the accumulator is configured to effect the statistical treatment.

18. The computer-readable storage medium of claim 15, wherein the apparatus being caused to generate the new sequence includes being caused to generate an initial new sequence, and
wherein the computer-readable storage medium has further computer-readable program code portions stored therein that, in response to execution by the processor, cause the apparatus to further at least improve the initial new sequence to produce the new sequence.

19. The computer-readable storage medium of claim 18, wherein the plurality of items are a plurality of tasks collectively complete a project, tasks of the plurality of tasks having respective start times and completion times,
wherein the apparatus being caused to improve the initial new sequence includes being caused to perform one or more iterations of a process for optimizing a tentative schedule of the plurality of tasks produced according to the initial new sequence,
the process for optimizing the tentative schedule includes for each iteration, the apparatus being caused to sort the plurality of tasks according to one or more keys to derive a temporary listing of scheduled tasks, and shift the scheduled tasks of the temporary listing towards either a commencement time boundary or a completion time boundary, commencing with one of the scheduled tasks and continuing in sorted order to a last of the scheduled tasks, without violating a constraint of the scheduled tasks, to generate a revised temporary listing of scheduled tasks to be implemented to complete the project, the revised temporary listing from a last of the one or more iterations corresponding to the new sequence produced by the improver.

20. The computer-readable storage medium of claim 19, wherein the apparatus being caused to shift the scheduled tasks includes being caused to individually unschedule and then reschedule each task of the scheduled tasks to a new start time as close to the commencement time boundary as possible, or to a new completion time as close to the completion time boundary as possible.

21. The computer-readable storage medium of claim 19, wherein for at least one iteration, the apparatus being caused to sort the plurality of tasks includes being caused to sort the plurality of tasks other than in chronological order by start time, or reverse chronological order by completion time.

* * * * *